United States Patent
Barba et al.

(10) Patent No.: US 10,591,276 B2
(45) Date of Patent: Mar. 17, 2020

(54) ARTICULATED ARM COORDINATE MEASURING MACHINE HAVING A COLOR LASER LINE PROBE

(71) Applicant: FARO Technologies, Inc., Lake Mary, FL (US)

(72) Inventors: Jacint R. Barba, Sanford, FL (US); Christopher Michael Wilson, Lake Mary, FL (US); Nitesh Dhasmana, Lake Mary, FL (US); Michael Shen, Lake Mary, FL (US); Jeremy W. Mares, Lake Mary, FL (US); Keith G. MacFarlane, Lake Mary, FL (US); Randy R. Fields, Lake Mary, FL (US); Paul C. Atwell, Lake Mary, FL (US); Kishore Lankalapalli, Sanford, FL (US); Yazid Tohme, West Chester, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 15/894,060

(22) Filed: Feb. 12, 2018

(65) Prior Publication Data

US 2019/0063899 A1 Feb. 28, 2019

Related U.S. Application Data

(60) Provisional application No. 62/551,377, filed on Aug. 29, 2017.

(51) Int. Cl.
*G01B 11/00* (2006.01)
*G01S 17/89* (2020.01)
(Continued)

(52) U.S. Cl.
CPC .......... *G01B 11/005* (2013.01); *B25J 19/022* (2013.01); *B25J 19/04* (2013.01); *G01B 5/008* (2013.01);
(Continued)

(58) Field of Classification Search
CPC .. G01B 11/005; G01B 5/008; G01B 11/2509; B25J 19/022; B25J 19/04; G01S 17/89
(Continued)

(56) References Cited

U.S. PATENT DOCUMENTS

| 952,908 A | 3/1910 | Kaye |
| 6,407,817 B1 | 6/2002 | Norita et al. |

(Continued)

OTHER PUBLICATIONS

"Bay filter" Wikipedia, Aug. 21, 2017, Retrieved from the Internet: ULR: https://en.wikipedia.org/w/index.php?title=Bayer_filter&oldid=796540059 [retrieved on Oct. 15, 2018] Section "Bayer filter" and "Demosaicing" (9 pgs).

(Continued)

*Primary Examiner* — Tri T Ton
(74) *Attorney, Agent, or Firm* — Cantor Colburn LLP

(57) ABSTRACT

An articulated arm coordinate measuring machine includes a laser line probe. The laser line probe includes a camera that can acquire metrology data and color data. A laser line probe is coupled to a probe end of an articulated arm. The laser line probe having a projector and a camera, the projector being operable to project a line of light at one or more predetermined wavelengths, the camera having a lens assembly optically coupled to a sensor assembly. The sensor assembly has a photosensitive array and a filter disposed between the photosensitive array and the lens assembly. The filter includes a plurality of red, green and blue pixels in a predetermined arrangement. A controller is coupled to the laser line probe and causes the camera to acquire a metrology image and a color image. The controller assigns a color (Continued)

to the three-dimensional coordinate points based on the color image.

13 Claims, 34 Drawing Sheets

(51) Int. Cl.
| | |
|---|---|
| *G01B 11/25* | (2006.01) |
| *B25J 19/02* | (2006.01) |
| *B25J 19/04* | (2006.01) |
| *G01B 5/008* | (2006.01) |
| *G01J 3/51* | (2006.01) |

(52) U.S. Cl.
CPC .......... *G01B 11/25* (2013.01); *G01B 11/2509* (2013.01); *G01B 11/2513* (2013.01); *G01J 3/513* (2013.01); *G01S 17/89* (2013.01)

(58) Field of Classification Search
USPC ................................................ 356/600–640
See application file for complete search history.

(56) References Cited

U.S. PATENT DOCUMENTS

| | | |
|---|---|---|
| 6,664,531 B2 | 12/2003 | Gartner et al. |
| 7,349,104 B2 | 3/2008 | Geng |
| 7,804,585 B2 | 9/2010 | Tropf |
| 8,045,791 B2 | 10/2011 | Chang et al. |
| 8,339,616 B2 | 12/2012 | Teodorescu |
| 8,537,374 B2 * | 9/2013 | Briggs .................. G01B 5/008 356/614 |
| 8,649,025 B2 | 2/2014 | Teodorescu |
| 8,705,016 B2 | 4/2014 | Schumann et al. |
| 8,832,954 B2 | 9/2014 | Atwell et al. |
| 9,007,439 B2 | 4/2015 | Banks |
| 9,134,339 B2 | 9/2015 | Becker et al. |
| 9,234,749 B2 | 1/2016 | Jin |
| 9,239,235 B2 | 1/2016 | Miyagawa |
| 9,304,582 B1 | 4/2016 | Kamarshi et al. |
| 9,364,300 B2 | 6/2016 | Tchouprakov et al. |
| 9,377,413 B2 | 6/2016 | Hermary et al. |
| 9,402,070 B2 | 7/2016 | Tohme et al. |
| 9,417,316 B2 | 8/2016 | Schumann et al. |
| 9,429,416 B2 | 8/2016 | Kocic et al. |
| 9,456,202 B2 | 9/2016 | Lu et al. |
| 9,506,744 B2 | 11/2016 | Bridges |
| 9,529,085 B2 | 12/2016 | Stutz et al. |
| 9,531,967 B2 | 12/2016 | Bridges |
| 9,599,455 B2 | 3/2017 | Heidemann et al. |
| 9,628,775 B2 | 4/2017 | Bridges et al. |
| 9,658,061 B2 | 5/2017 | Wilson et al. |
| 9,686,532 B2 | 6/2017 | Tohme |
| 9,709,387 B2 | 7/2017 | Fujita et al. |
| 9,746,560 B2 | 8/2017 | Steffey et al. |
| 9,762,883 B2 | 9/2017 | Vollrath et al. |
| 9,769,463 B2 | 9/2017 | Hillebrand et al. |
| 9,772,173 B2 | 9/2017 | Atwell et al. |
| 2002/0048396 A1 | 4/2002 | Bewley et al. |
| 2011/0316978 A1 * | 12/2011 | Dillon ................ G01B 11/2513 348/46 |
| 2013/0027515 A1 | 1/2013 | Vintner et al. |
| 2014/0198185 A1 | 7/2014 | Haugen et al. |
| 2015/0185000 A1 * | 7/2015 | Wilson .................. G01B 11/25 356/72 |
| 2016/0093099 A1 | 3/2016 | Bridges |
| 2016/0313114 A1 | 10/2016 | Tohme |
| 2017/0094251 A1 | 3/2017 | Wolke et al. |
| 2017/0102224 A1 | 4/2017 | Bridges et al. |
| 2017/0211927 A1 | 7/2017 | Bridges et al. |

OTHER PUBLICATIONS

Anonymous: "Short Courses-Metering and Middle Gray", Apr. 4, 2017 (Apr. 4, 2017), Retrieved from Internet: URL: https:/web.archive.org/web/20170404184949/http://www.shortcourses.com/tabletop/lighting1-9.html [retrieved on Oct. 17, 2018] (11 pgs).
Extended European Search Report for Application No. 18189828.9 dated Oct. 30, 2018; (11 pgs).
Extended European Search Report for Application No. 18187691.3 dated Oct. 31, 2018; (9 pgs).
Liesel Holstener: "Exposing to the right—Wikipedia", Apr. 26, 2017 (Apr. 26, 2017), Retrieved from the Internet: URL: https://en.wikipedia.org/w/index.php?tite=Exposing_to_the_right&oldid=777310454[retrieved on Oct. 17, 2018] (pp. 1-6).
"CLS60—Real Time 3-D Color Laser Sensor" Micrometric Vision Technologies, Inc., Vision in 3-D Sensing, 21671 Criptana, Mission Viejo, CA 92692, USA, www.micrometric-vision.com (retrieved Mar. 14, 2018).

* cited by examiner

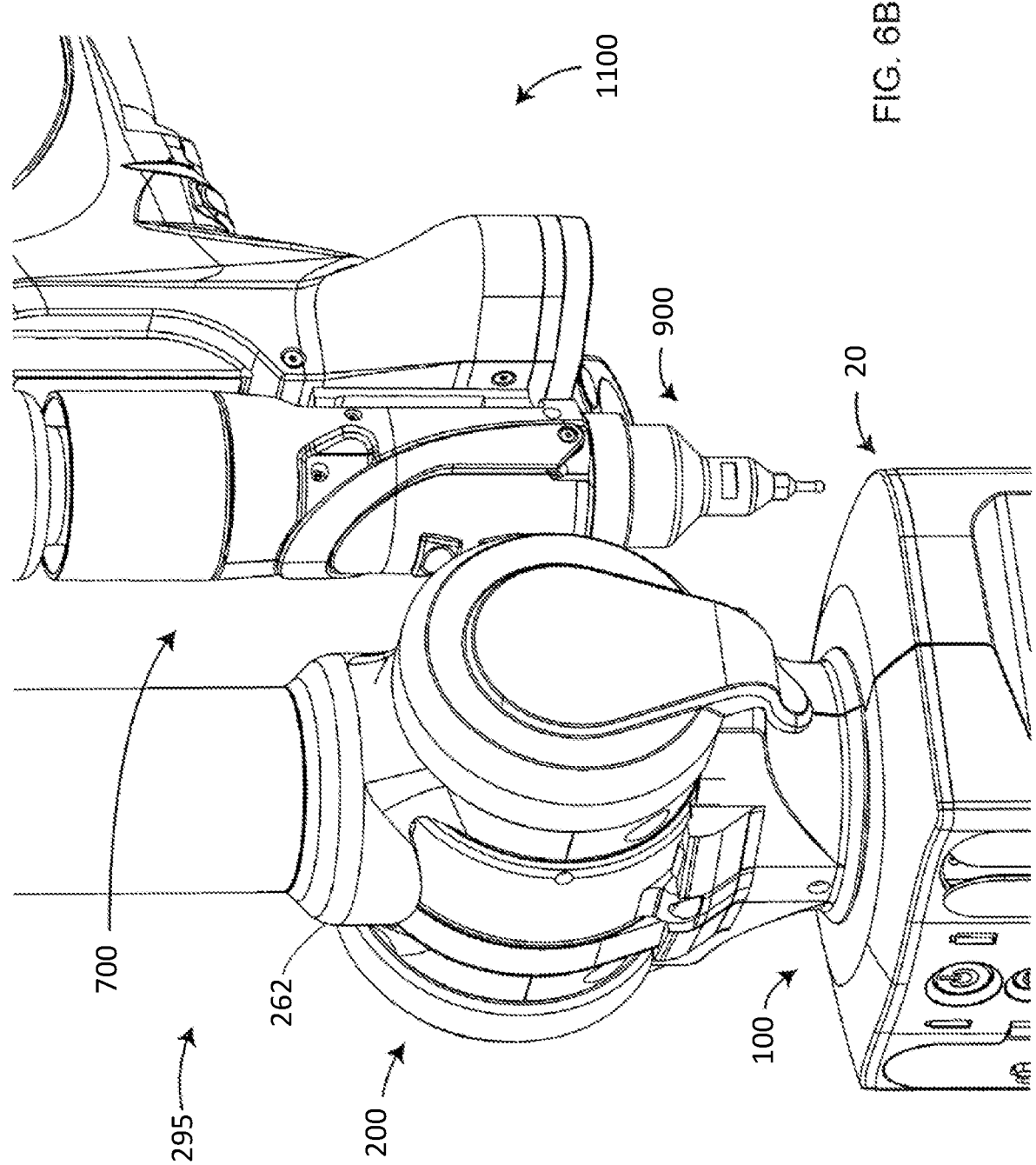

TOP VIEW

ARTICULATED ARM COORDINATE MEASURING MACHINE HAVING A COLOR LASER LINE PROBE

CROSS REFERENCE TO RELATED APPLICATIONS

This application claims the benefit of U.S. Provisional Application Ser. No. 62/551,377 filed Aug. 29, 2017, the entire disclosure of which is incorporated herein by reference.

BACKGROUND

The present disclosure relates to a coordinate measuring system, and in particular to coordinate measuring system having a laser line probe that acquires texture or color during the scanning process.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3D) form on a computer screen. In other cases, the data are provided to the user in numeric form, for example when measuring the diameter of a hole, the text "Diameter=1.0034" is displayed on a computer screen.

To assist with measuring objects, one type of accessory that is commonly used on an AACMM is a laser line probe (LLP). An LLP is a triangulation-based, non-contact device that includes a projector and a camera. The projector includes a light source that emits a light, typically as a line. The projector also includes a lens that projects the emitted light onto an object. The emitted light may be laser light, partially coherent light, or incoherent light. The camera includes a camera-type imaging device, such as a charge-coupled device ("CCD") or CMOS photosensitive array. The camera also includes a camera lens that captures the pattern of light on the object surface and projects it onto the photosensitive array. The camera is typically positioned adjacent the laser light source within the LLP device. The projector has a virtual emission point from which the line or stripe of light appears to "fan out" in an angle in one dimension and in a flat sheet in the orthogonal dimension. The camera has a camera perspective center through which rays of light from the pattern on the object appear to pass in traveling to the photosensitive array. The line segment between the virtual emission point and the camera perspective center is called the baseline, and the length of the baseline is called the baseline length.

The fan of light projected by the LLP strikes the surface of the object and forms a relatively bright stripe of light on the object surface. The camera captures the 3D silhouette or profile of the laser stripe projected onto the object. The LLP is moved by the user such that the projected line stripe extends over all or at least the desired portion of the object within the LLP's field of view. That way, by moving the LLP over the object, hundreds of cross sections of the object surface are captured as 3D point clouds of raw data. Some LLPs can capture 280 frames, or stripes, of 3D data per second, or approximately 560,000 points of data per second. Signal processing electronics (e.g., a computer or a processor) are provided that run software which processes the 3D raw point cloud data into the resulting 3D image of the object that includes dimensional measurements as obtained by the LLP and its laser stripe and triangulation measurement process.

The image of the reflected line on the imaging device normally changes as the distance between the imaging device and the object surface changes. By knowing the baseline distance, the orientation of the projector and camera with respect to baseline, and the coordinates on the photosensitive array of the imaged pattern of light, known triangulation methods may be used to measure 3D coordinates of points on the surface of the object. That is, as the LLP is moved, the imaging device creates an image of each projected line stripe. Any deviations on the photosensitive array from a straight line pattern may be translated into height variations on the object surface, thereby defining the object surface. In other words, the method described hereinabove digitizes the shape and position of the object within the field of view of the LLP.

In traditional LLP devices, the photosensitive array is generates a signal based on the brightness of the returned light. In other words, a gray-scale image of the surface may be acquired. Therefore, the color or texture of the surface is not acquired of the surface.

Accordingly, while existing laser line probes are suitable for their intended purposes there remains a need for improvements in acquiring color information of a surface being scanned with an LLP.

BRIEF DESCRIPTION

According to one aspect of the invention, a portable articulated arm coordinate measuring machine (AACMM) for measuring the coordinates of an object in space is provided. The AACMM comprises a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; an electronic circuit that receives the position signal from the at least one position transducer and provides data corresponding to a position of the measurement device; a probe end disposed between the measurement device and the first end; a laser line probe coupled to the probe end, the laser line probe having a l projector and a camera, the projector being operable to project a line of light at one or more predetermined wavelengths, the camera having a lens assembly optically coupled to a sensor assembly, the sensor assembly having a photosensitive array and a filter disposed between the photosensitive array and the lens assembly, the filter having a plurality of red, green and blue pixels in a predetermined arrangement; and a controller operably coupled to the laser line probe, the controller being operable to cause the camera to acquire a metrology image and a color image, wherein the controller and the electronic circuit cooperate to determine the three-dimensional coordinates of points on a surface based at least in part on the metrology image and to assign a color to the points based at least in part on the color image.

According to another aspect of the invention, a method of determining three-dimensional coordinates of points on a surface is provided. The method includes emitting a line of light from a projector in a laser line probe coupled to the end of an articulated arm onto a surface of an object; acquiring with a first portion of pixels on a photosensitive array in a camera in the laser line probe a metrology image of the line of light on the surface, the camera having a filter, the filter having a predetermined arrangement of red, green and blue pixels; determining a plurality of center of gravity locations based at least in part on the metrology image; acquiring with the photosensitive array a color image; and assigning a color to each of the center of gravity locations based at least in part on the color image.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 6B is an isometric view showing relative positions of some elements of the AACMM when connected arm segments are held in a vertical orientation according to an embodiment of the present invention;

The detailed description explains embodiments of the invention, together with advantages and features, by way of example with reference to the drawings.

DETAILED DESCRIPTION

A laser line probe is provided that acquires color data about a surface as the surface is being scanned by the laser line probe. Embodiments of the present invention provide for the acquiring of measurement or metrology data and surface color data with a single camera. Embodiments of the present invention include an AACMM having a laser line probe that acquires color data about the surface. Further embodiments of the present invention a laser line probe having a projector that emits light at a predetermined wavelength for measuring metrology data. Still further embodiments of the present invention provide for a laser line probe that include multiple photosensitive arrays, hyper-spectral sensors or multi-spectral arrays.

Figure 1A:
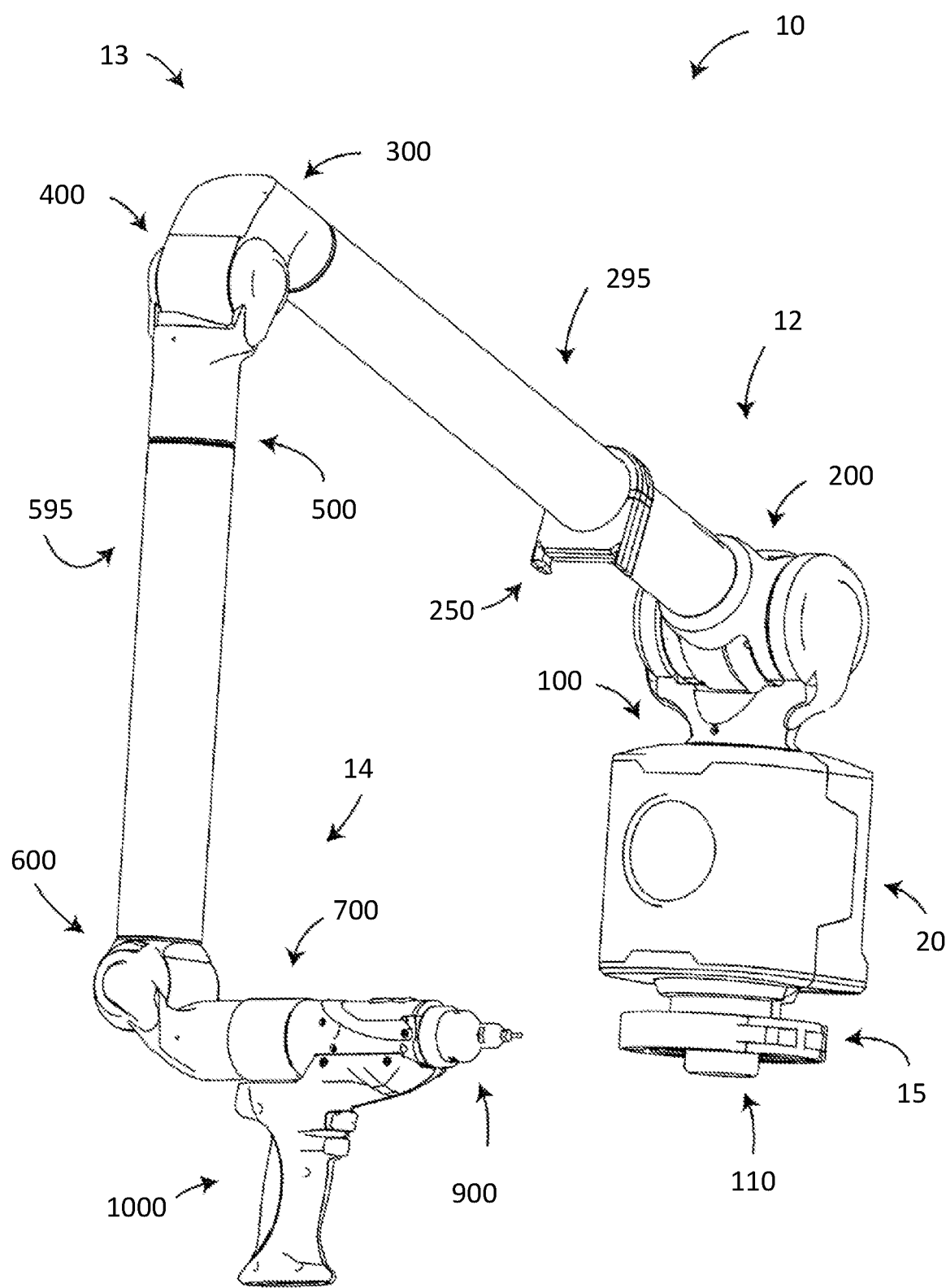
FIGS. 1A, 1B are two isometric views of a portable articulated AACMM according to an embodiment of the present invention.
Figure 1B:
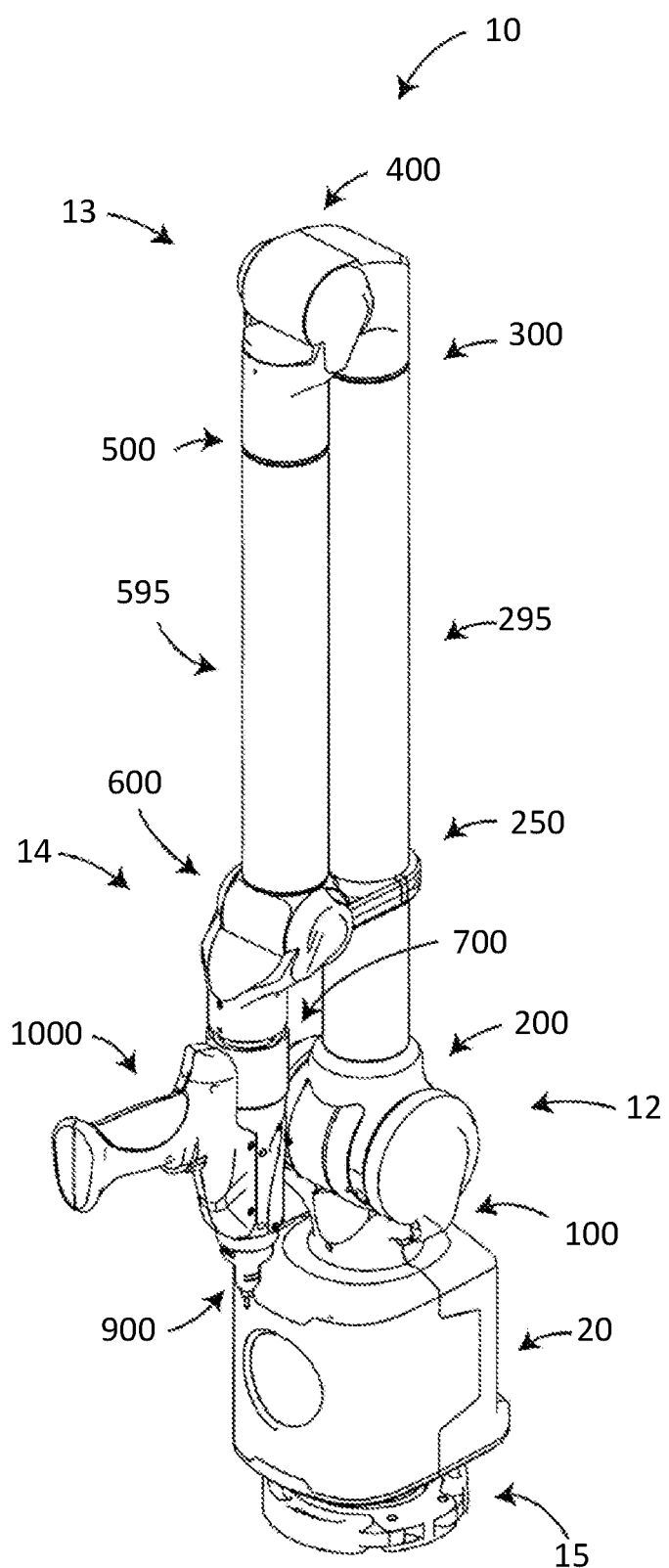
Figure 1C:
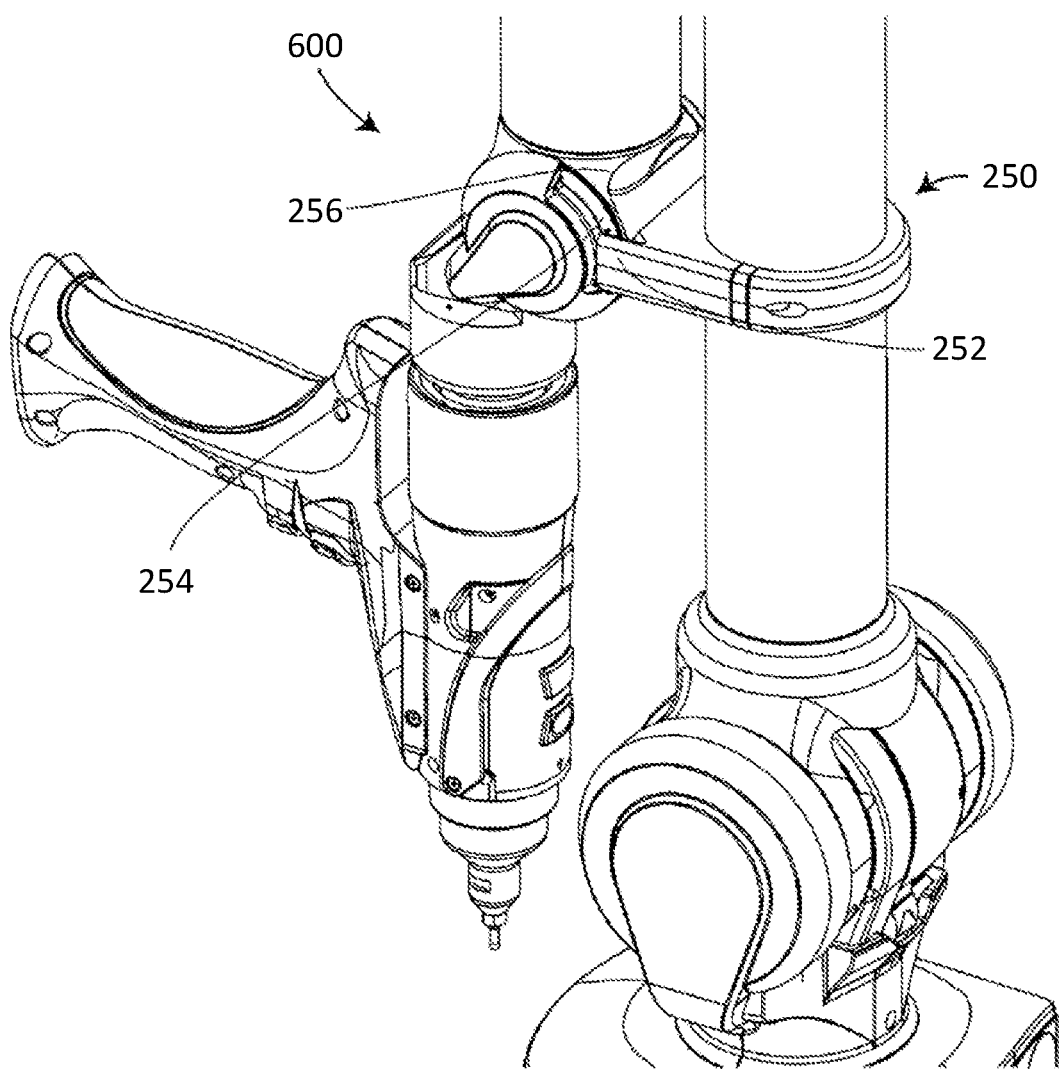
FIG. 1C is a partial isometric view of an AACMM according to an embodiment of the present invention.

FIGS. 1A, 1B, 1C illustrate, in isometric view, an AACMM 10 according to various embodiments of the present invention, the AACMM being one type of coordinate measuring machine. In an embodiment, a first segment 295 and a second segment 595 are connected to a base 20 on one end and a measurement device on the other end. In an embodiment, the measurement device is a tactile-probe assembly 900.

In an embodiment illustrated in FIGS. 1A, 1B, 1C, the AACMM 10 comprises includes seven rotational elements; hence the AACMM 10 is referred to as a seven-axis AACMM. In other embodiments discussed herein below, the AACMM 10 is a six-axis AACMM. The seven-axis AACMM 10 of FIGS. 1A, 1B, 1C includes first-axis assembly 100, second-axis assembly 200, third-axis assembly 300, fourth-axis assembly 400, fifth-axis assembly 500, sixth-axis assembly 600, and seventh-axis assembly 700. In an embodiment, a tactile probe assembly 900 and a handle 1000 are attached to the seventh-axis assembly. Each of the axis assemblies may provide either a swivel rotation or a hinge rotation. In the embodiment illustrated in FIGS. 1A, 1B, 1C, the first-axis assembly 100 provides a swivel rotation about an axis aligned to a mounting direction of the base 20. In an embodiment, the second axis assembly 200 provides a hinge rotation about an axis perpendicular to the first segment 295. The combination of the first-axis assembly 100 and the second-axis assembly 200 is sometimes colloquially referred to as a shoulder 12 since in some embodiments the possible motions of the shoulder 12 of the AACMM 10 resemble the motions possible with a human shoulder. In one embodiment, the shoulder 12 is a ball and socket type of connection.

In the embodiment illustrated in FIGS. 1A, 1B, 1C, the third-axis assembly 300 provides a swivel rotation about an axis aligned to the first segment 295. The fourth-axis assembly 400 provides a hinge rotation about an axis perpendicular to second segment 595. The fifth-axis assembly 500 provides a swivel rotation about an axis aligned to the second segment 595. The combination of the third-axis assembly 300, the fourth-axis assembly 400, and the fifth-axis assembly 500 is sometimes colloquially referred to as an elbow 13 since in some embodiments the possible motions of the elbow 13 of the AACMM 10 resemble the motions possible with a human elbow.

In the embodiment illustrated in FIGS. 1A, 1B, 1C, the sixth-axis assembly provides a hinge rotation about an axis perpendicular to the second segment 595. In an embodiment, the AACMM 10 further comprises a seventh-axis assembly, which provides a swivel rotation of probe assemblies (e.g. probe 900) attached to the seventh axis. The sixth-axis assembly 600, or the combination of the sixth-axis assembly 600 and the seventh-axis assembly 700, is sometimes colloquially referred to as a wrist 14 of the AACMM 10. The wrist 14 is so named because in some embodiments it provides motions similar to those possible with a human wrist. The combination of the shoulder 12, first segment 295, elbow 13, second segment 595, and wrist 14 resembles in many ways a human arm from human shoulder to human wrist. In some embodiments, the number of axis assemblies associated with each of the shoulder, elbow, and wrist differ from the number shown in FIGS. 1A, 1B, 1C. It is possible, for example, to move the third-axis assembly 300 from the elbow 13 to the shoulder 12, thereby increasing the number of axis assemblies in the shoulder to three and reducing the number of axis assemblies in the wrist to two. Other axis combinations are also possible.

In an embodiment, a parking clamp 250 on the first segment 295 includes parking-clamp fingers 252 (FIG. 1C) that tie together the first segment 295 to the second segment 595 while holding both segments in a vertical orientation. In an embodiment, the parking-clamp fingers 252 grip a parking clamp recess 254 while a sixth-axis yoke bumper 256 cushions the parking clamp 250 against the sixth-axis assembly 600, thereby reducing or preventing potential mechanical shock as the first segment 295 and the second segment 595 are brought together. In an embodiment, the parking clamp 250 holds the first segment 295 and the second segment 595 fixed vertical orientation, thereby reducing or minimizing the space taken by the arm segments 295, 595 when the AACMM 10 is not in use performing a measurement. In an embodiment, an operator may release the parking clamp fingers 252, thereby permitting free movement of the arm segments 295, 595 as illustrated in FIG. 1A. In another embodiment, the parking clamp is attached to the second segment 595 rather than the first segment 295. In another embodiment, the parking clamp fingers attach to a different element than the parking-clamp recess of FIG. 1C. In another embodiment, clamping is provided by a different mechanism than the parking-clamp fingers 252.

Figure 2:
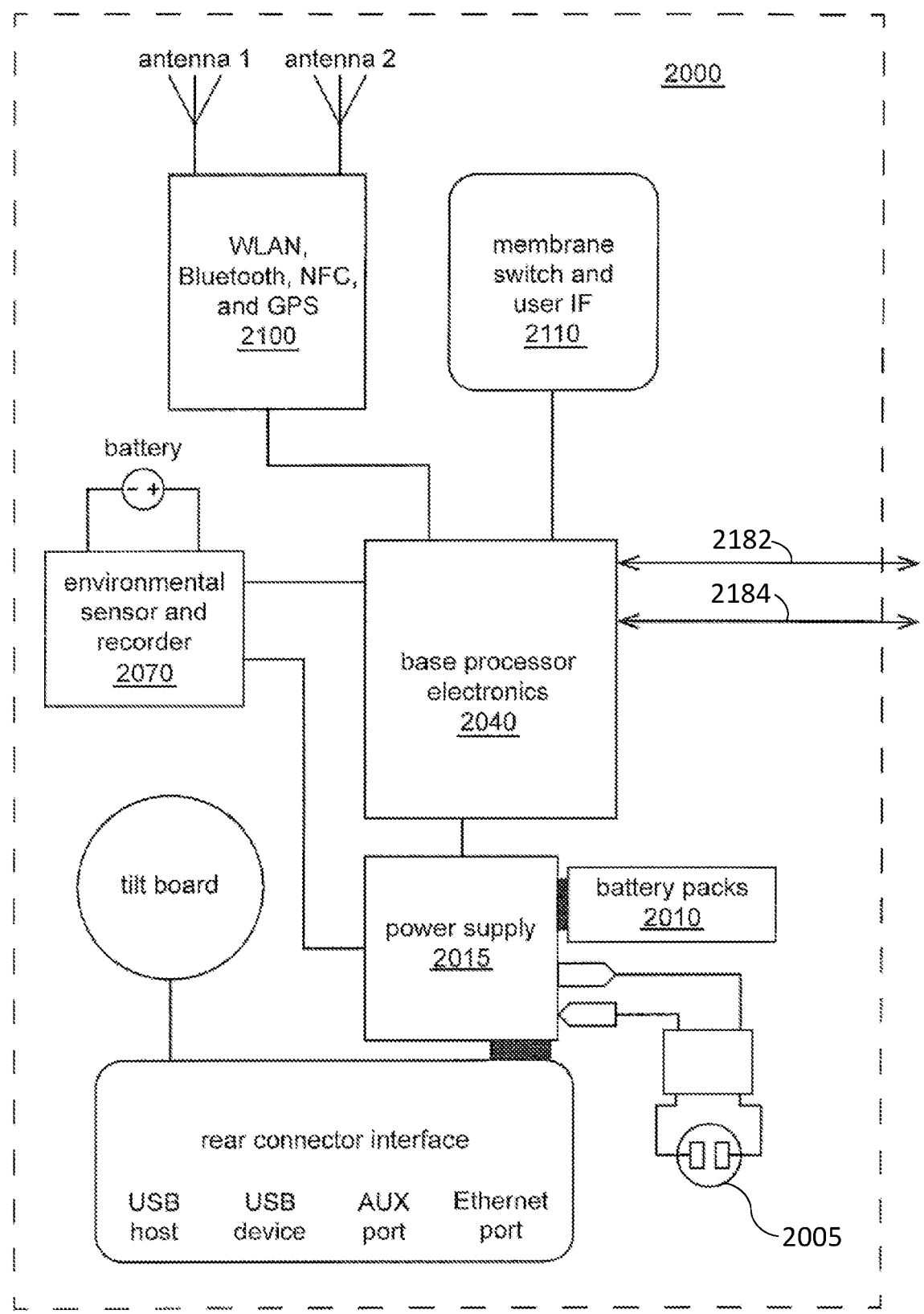
FIG. 2 is a block diagram of base electronics of an AACMM of FIG. 1 according to an embodiment of the present invention.
Figure 2A:
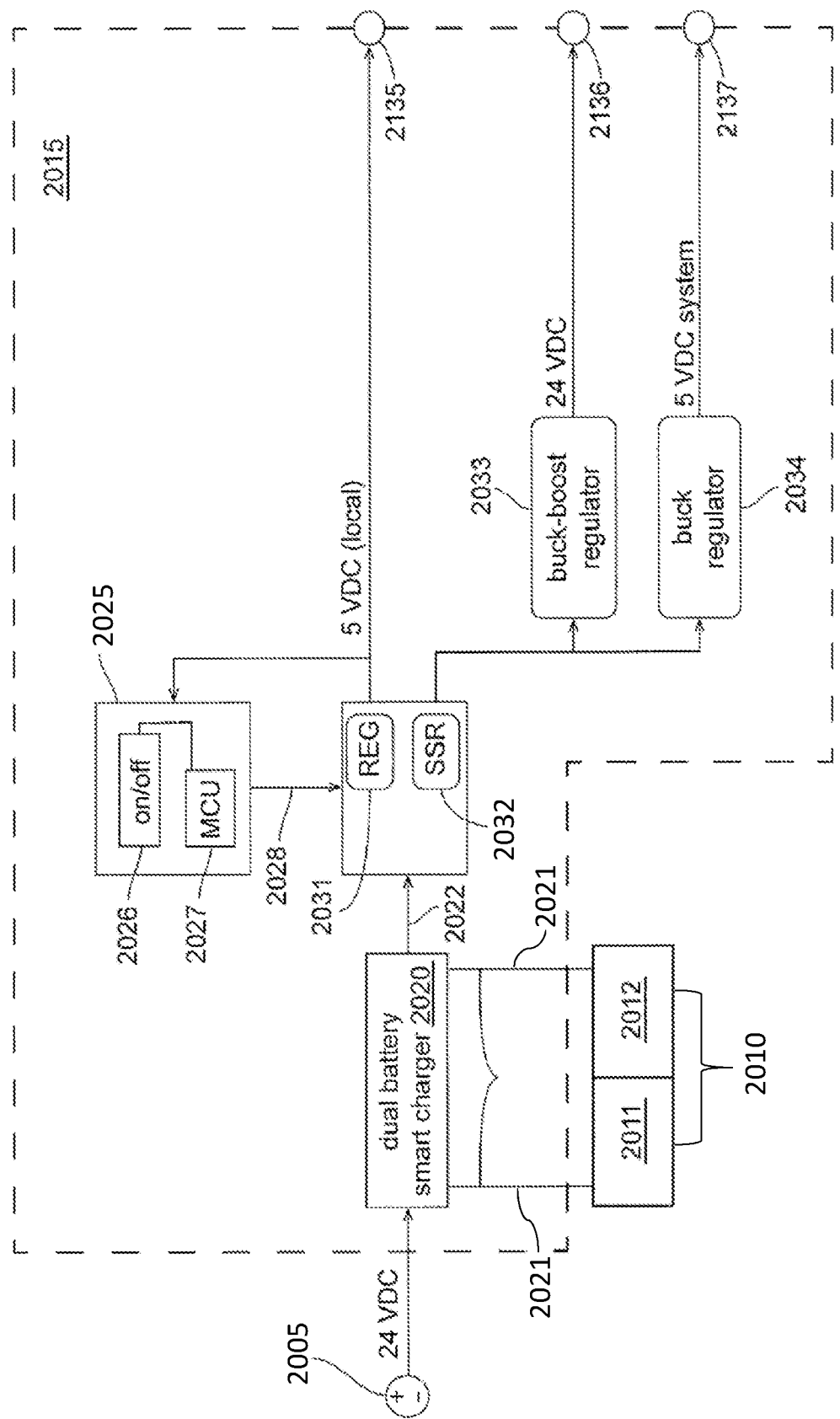
FIGS. 2A, 2B, 2C are block diagrams providing further detail of elements within the block diagram of FIG. 2 according to an embodiment of the present invention.

FIG. 2 is a block diagram of base electronics 2000. FIG. 2 includes modular power supply 2005, battery packs 2010, and a power supply 2015. These elements are shown in greater detail in a block diagram of FIG. 2A. In an embodiment, the modular power supply 2005 is located external to the power supply 2015 and is plugged into AC power mains to provide a dual battery smart charger 2020 with a voltage of 24 VDC. In an embodiment, the dual battery smart charger 2020 provides a portion of the voltage from the modular power supply 2005 to charge one or both of smart battery packs. In an embodiment, a System Management Bus (SMBUS) 2021, which is a single-ended simple two-wire bus for the purpose of lightweight communication, provides communication among the dual battery smart charger 2020 and smart battery packs 2010. In an embodiment, the smart battery packs 2010 include a first battery pack 2011 and a second battery pack 2012. In an embodiment, one battery pack provides electrical power to the AACMM 10 while the other battery pack is being charged. In an embodiment, either or both battery packs 2011, 2012 may be removed while power from the modular power supply 2005 is being applied. In other words, the battery packs may be "hot swapped."

Figure 6A:
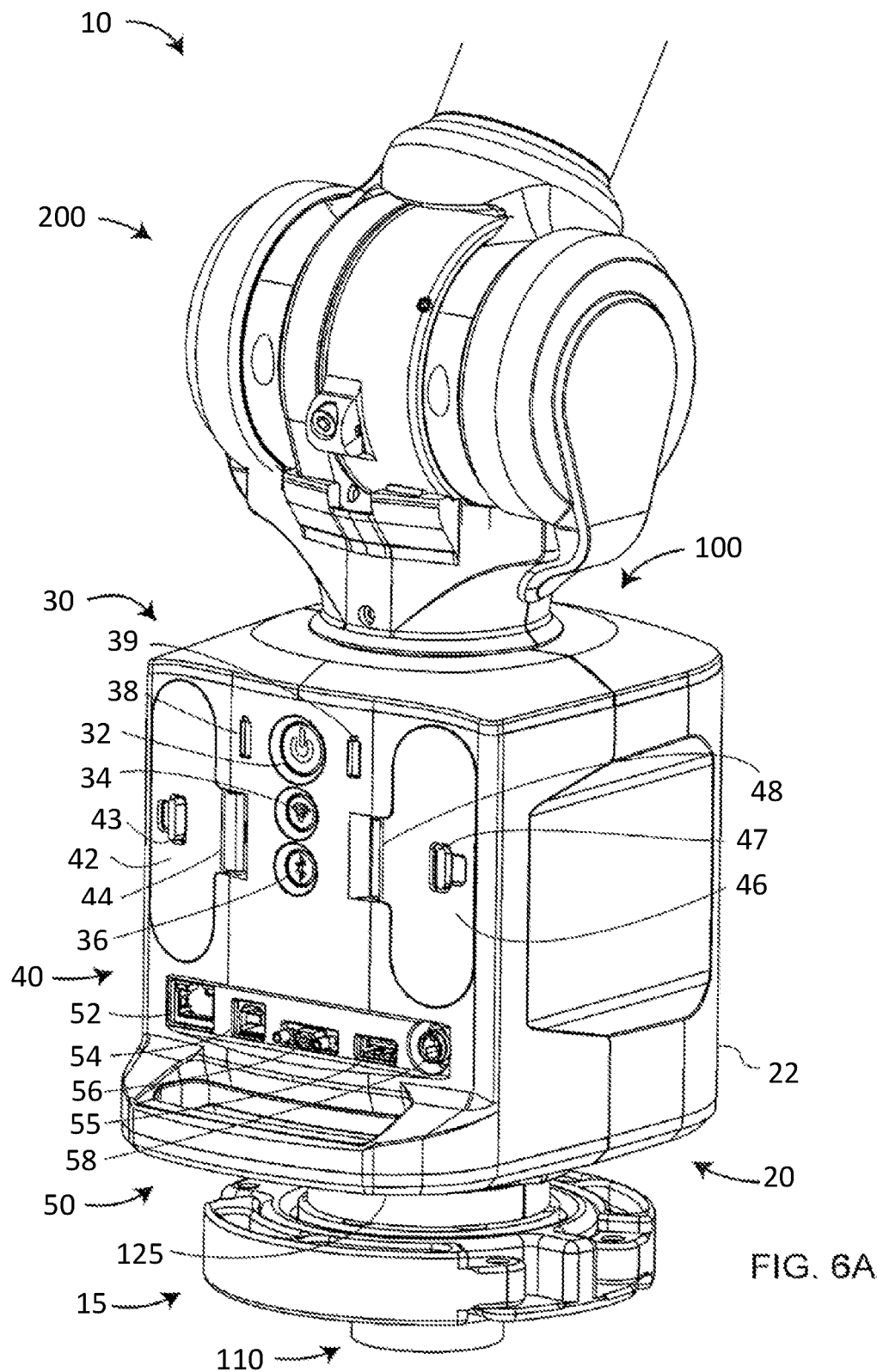
FIG. 6A is an isometric view describing some elements in a lower portion of the AACMM according to an embodiment of the present invention.

In an embodiment, each battery pack 2011, 2012 includes a 14.4 VDC lithium-ion battery. In an embodiment, the battery packs 2011, 2012 are disposed in the base 20 behind a first battery door 42 and a second battery door 46, respectively, as shown in FIG. 6A. In an embodiment, the first battery door 42 and the second battery door 46 cooperate with a first battery-door hinge 44 and a second battery-door hinge 48, respectively, as well as a first battery-door latch 43 and a second battery-door latch 47, respectively. In an embodiment, a first-battery indicator light 38 and a second-battery indicator light 39 indicate an extent to which the first battery pack 2011 and the second battery pack 2012, respectively, are charged. In an embodiment, the external 24 VDC power supply attaches with a locking connector to a power supply port 58 shown in FIG. 6A.

Part of the electrical power passing through the line 2022 arrives at the regulator 2031, which provides a 5 VDC local voltage through a point 2135 to the environmental sensor and recorder 2070 (FIG. 2C) and to a user interface (IF) 2025, which includes an electrical on/off switch 2026 and a microcontroller (MCU) 2027. The electrical on/off switch 2026 is activated in response to pressing of a mechanical on-off button 32 shown in FIG. 6A. When the on/off switch 2026 is in the on state, the MCU 2027 produces a signal 2028 that causes a solid-state relay (SSR) 2032 to close, passing the voltage on the line 2022 to a buck-boost regular 2033 and a buck regulator 2034. The buck regulator 2034 provides a 5 VDC system voltage, which from a point 2137 is stepped down to secondary voltages 3.3 VDC, 1.8 VDC, 1.5 VDC, and 1.2 VDC for use by processors and memory. The buck-boost regulator 2033 provides a 24 VDC signal from a point 2136 to electronics in the arm segments, the arm end, and accessories attached to the arm end.

Figure 2B:
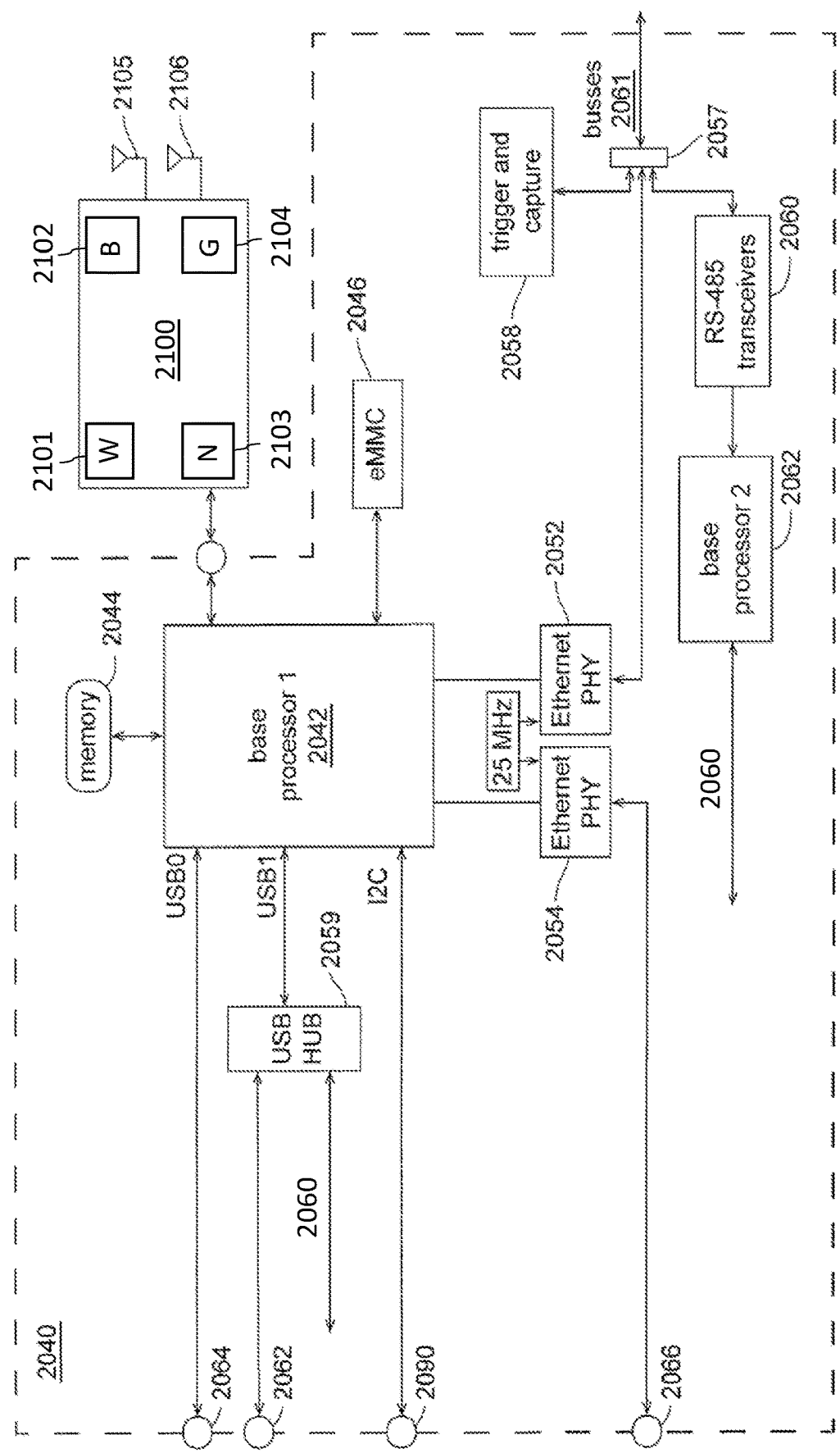
Figure 2C:
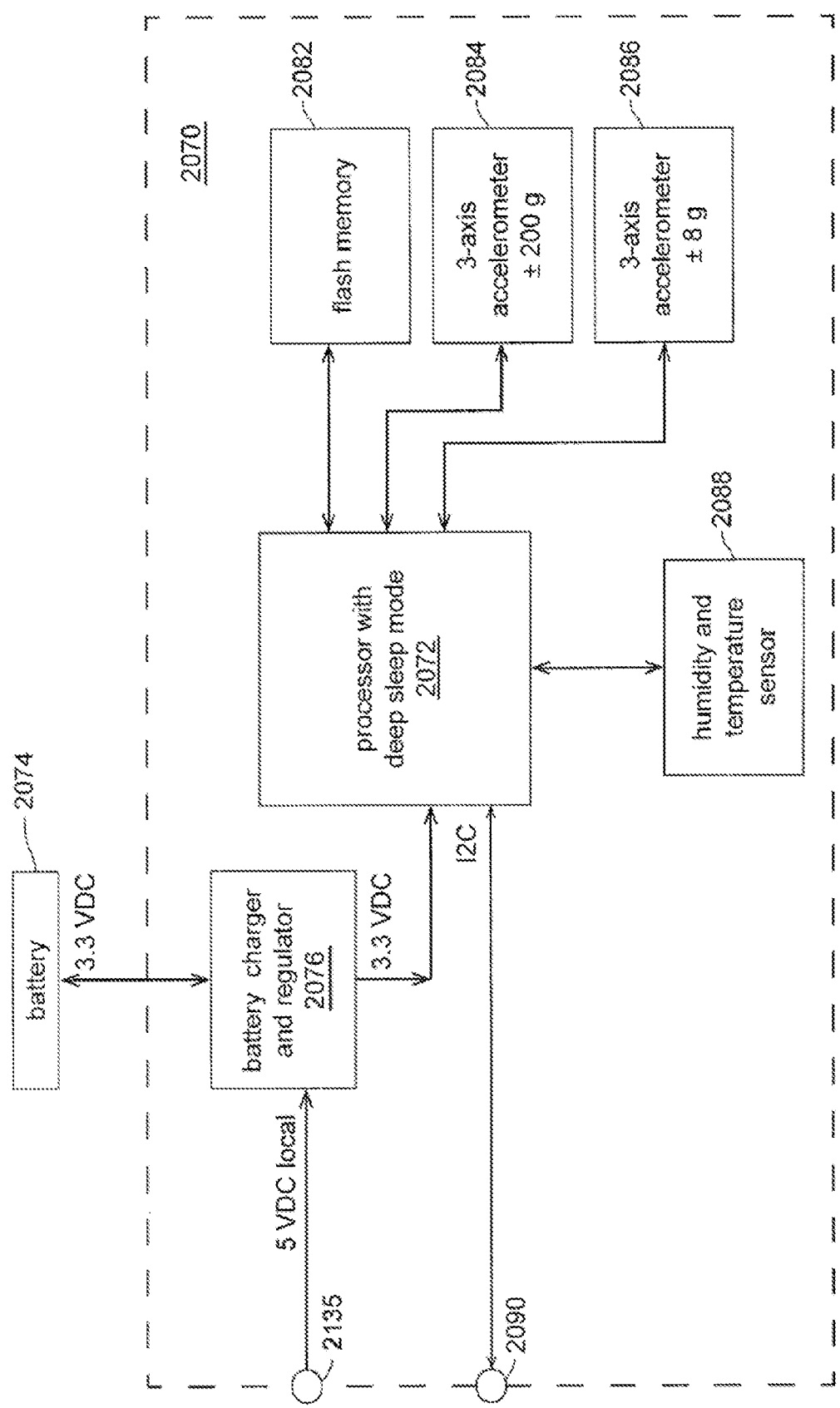

A block diagram of the environmental sensor and recorder 2070 is shown in FIG. 2C. If the voltage on the line 2022 is zero, then the 5 VDC local voltage is not present at the point 2135 in the environmental sensor and recorder 2070. In this case, a battery 2074 provides a 3.3 VDC signal to the components of the environmental sensor and recorder 2070. The 3.3 VDC signal passes through a battery charger and regulator 2076 to provide the 3.3 VDC signal to a processor with deep-sleep mode 2072. The processor 2072 receives readings from a humidity-and-temperature sensor 2088, a three-axis accelerometer 2084 that measures to ±200 g, and a three-axis accelerometer 2086 that measures to ±8 g. In operation, the processor stores readings every 15 minutes on a flash memory 2082. In an embodiment, the processor also saves on the flash memory 2082 large acceleration events observed by the three-axis accelerometers 2084, 2086. If the 5 VDC local voltage is present at the point 2135, then the battery charger 2076 uses the 5 VDC local voltage to charge the battery 2074.

FIG. 2B is a block diagram of the base processor electronics 2040, which includes a first base processor 2042 and a second base processor 2062. In an embodiment, the second base processor 2062 is a real-time processor. In an embodiment, the processor with deep sleep mode 2072 (FIG. 2C) communicates with the first base processor 2042 over an Inter-Integrated Circuit (I2C) bus through the point 2090. In an embodiment, whenever electrical power is being provided to the AACMM 10 by the modular power supply 2005 rather than a battery pack, the first base processor 2042 provides a 5 VDC, 2.5 Amp signal through a Universal Serial Bus (USB) external device port 2064 for use by any external device. This voltage is provided to a USB charging port 55 shown in FIG. 6A. A user may attach any compatible device to obtain power from the USB charging port 55. Currently USB standards are ratified by a USB Implementers Forum (USB-IF).

In an embodiment, the first base processor 2042 exchanges data through a point with external USB host devices, such as external computing devices, over a USB data transfer port 54 shown in FIG. 6A. In an embodiment, electrical signals pass to and from the USB host device through a point 2062 to a USB hub 2059 and on to the first base processor 2042.

In an embodiment, an Ethernet signal may be provided over an Ethernet port 52 as shown in FIG. 6A. Ethernet is a computer networking technology based on IEEE 802.3 standards. The Ethernet signal arrives at a point 2066 in FIG. 2B, travels to an Ethernet PHY 2054, which is clocked at 25 MHz, before arriving at the first base processor 2042. The Ethernet PHY 2054 provides analog signals physical access to a link layer.

A second Ethernet path enables bidirectional communication with electrical components internal to the AACMM 10. The second Ethernet path, which includes an Ethernet PHY 2052, passes through a connector 2057 to join a collection of busses 2061. In an embodiment, the Ethernet is gigabit Ethernet, which means that data may be transferred at a rate of one gigabit per second. In an embodiment, the second Ethernet path mainly transfers data obtained by AACMM accessory devices such as laser line probes (LLPs).

Figure 7A:
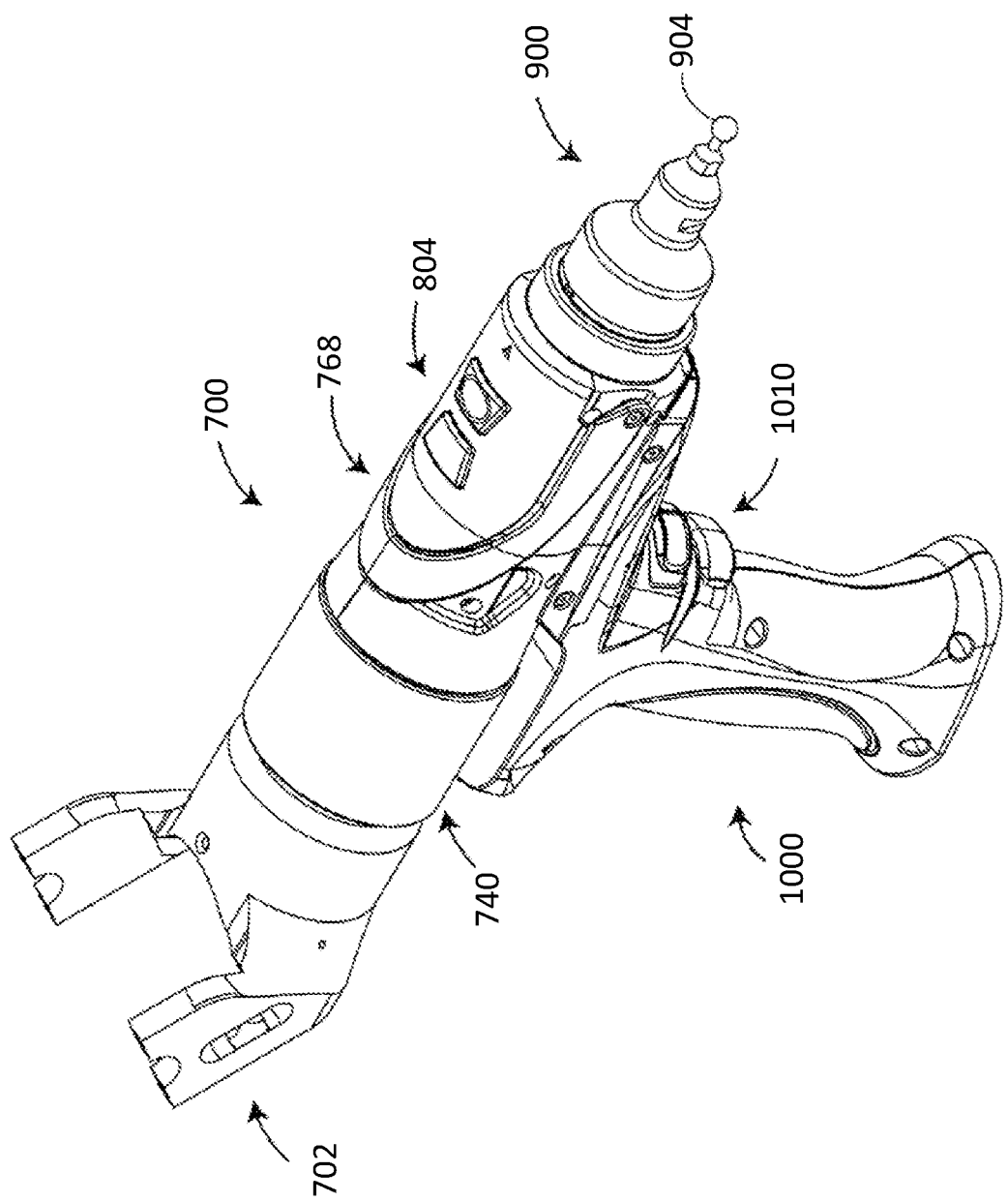
FIG. 7A is an isometric view of a seventh-axis assembly including a removable handle according to an embodiment of the present invention.

In an embodiment, electrical signals obtained from a tactile-probe assembly (e.g. probe 900) pass through an RS-485 transceiver 2060 before arriving at the second base processor 2062. Examples of a tactile-probe assembly are a hard-probe assembly 900 shown in FIGS. 1A, 1B and a touch-trigger probe assembly 960 in FIG. 22A. When directed by an operator, a hard-probe assembly 900 returns encoder readings to the base processor electronics 2040 at regular intervals set by a capture signal sent from the base processor electronics 2040. At each capture interval, angular readings are returned to the base processor electronics 2040, thereby enabling calculation of a position of a probe tip 904 (FIG. 7A) on the hard-probe assembly 900. In contrast, a touch-trigger probe assembly triggers a reading when a designated force is applied to the probe tip 904. Hence angular readings are taken in response to the trigger signal sent from the touch-trigger probe assembly. A signaling unit 2058 broadcasts capture signals and receives trigger signals. In an embodiment, the capture signals and trigger signals travel along a first bus 2182, shown in FIGS. 2, 4A, 4B. The second base processor 2062 communicates with the first base processor 2042 through a USB slave line 2060 that passes through the USB hub 2058 coupled to the first base processor 2042.

In an embodiment, the first base processor 2042 further connects to an embedded Multi-Media Controller (eMMC) 2046, which includes both flash memory and a flash memory controller integrated on the same silicon die. In an embodiment, the first base processor 2042 further connects to a memory 2044, which in an embodiment is a double data rate type-three synchronous dynamic random-access memory (DDR3 SDRAM).

In an embodiment, the base processor electronics 2040 further interfaces with a board 2100 having accessory communication and sensor devices. In an embodiment, the board 2100 includes a wireless local area network (WLAN) 2101. In an embodiment, the WLAN 2101 is an IEEE 802.11 Wi-Fi network enabled by pressing a Wi-Fi button 34 shown in FIG. 6A. Wi-Fi enables wireless communication between the AACMM 10 and an external device such as a stationary or mobile computing device.

In an embodiment, the board 2100 further includes a Bluetooth™ Low Energy (BLE) device 2102 capable of wirelessly exchanging data with external devices such as computing devices. BLE is a wireless personal area network technology designed and marketed by the Bluetooth Special Interest Group. The BLE device 2102 is enabled by pressing a Bluetooth™ button 36 shown in FIG. 6A. The on-off button 32, the Wi-Fi button 34, and the Bluetooth™ button 36 are all part of a larger membrane switch and user interface (IF) 2110 shown in FIG. 2.

In an embodiment, the board 2100 further includes near-field communication (NFC) hardware 2103. In an embodiment, the NFC hardware 2103 includes a dual-interface memory/tag device that communicates with an external NFC reader and a wired port that communicates with the first base processor 2042. In another embodiment, the NFC hardware includes a single-port NFC tag that communicates with an external NFC reader but may does not include a wired port for communicating with the first base processor 2042. The single-port NFC tag may store and transmit device data such as serial number, configuration, revision data, or encoder identification data. Descriptions of NFC use in AACMMs are given in commonly owned United States Published Patent Applications 2015/0330761, 2015/0330762, 2015/0330763, 2015/0330764, 2015/0330765, 2015/0330766, the contents all of which are incorporated by reference herein.

In an embodiment, the board 2100 further includes a global positioning system (GPS) receiver 2104. In an embodiment, the GPS receiver 2104 is used to track the location of the AACMM 10, for example, to determine the location of the AACMM 10 when leased. In another embodiment, the GPS receiver 2104 is used to synchronize multiple instruments, which may include AACMMs, laser trackers, scanners, or other devices. Descriptions of GPS used with AACMMs are given in United States Published Patent Application 2015/0355310, the contents of which is incorporated by reference herein. In an embodiment, WLAN 2101, Bluetooth™ 2102, NFC 2103, and GPS 2104 are used in conjunction with antennas, which may include antennas 2105, 2106.

Figure 3:
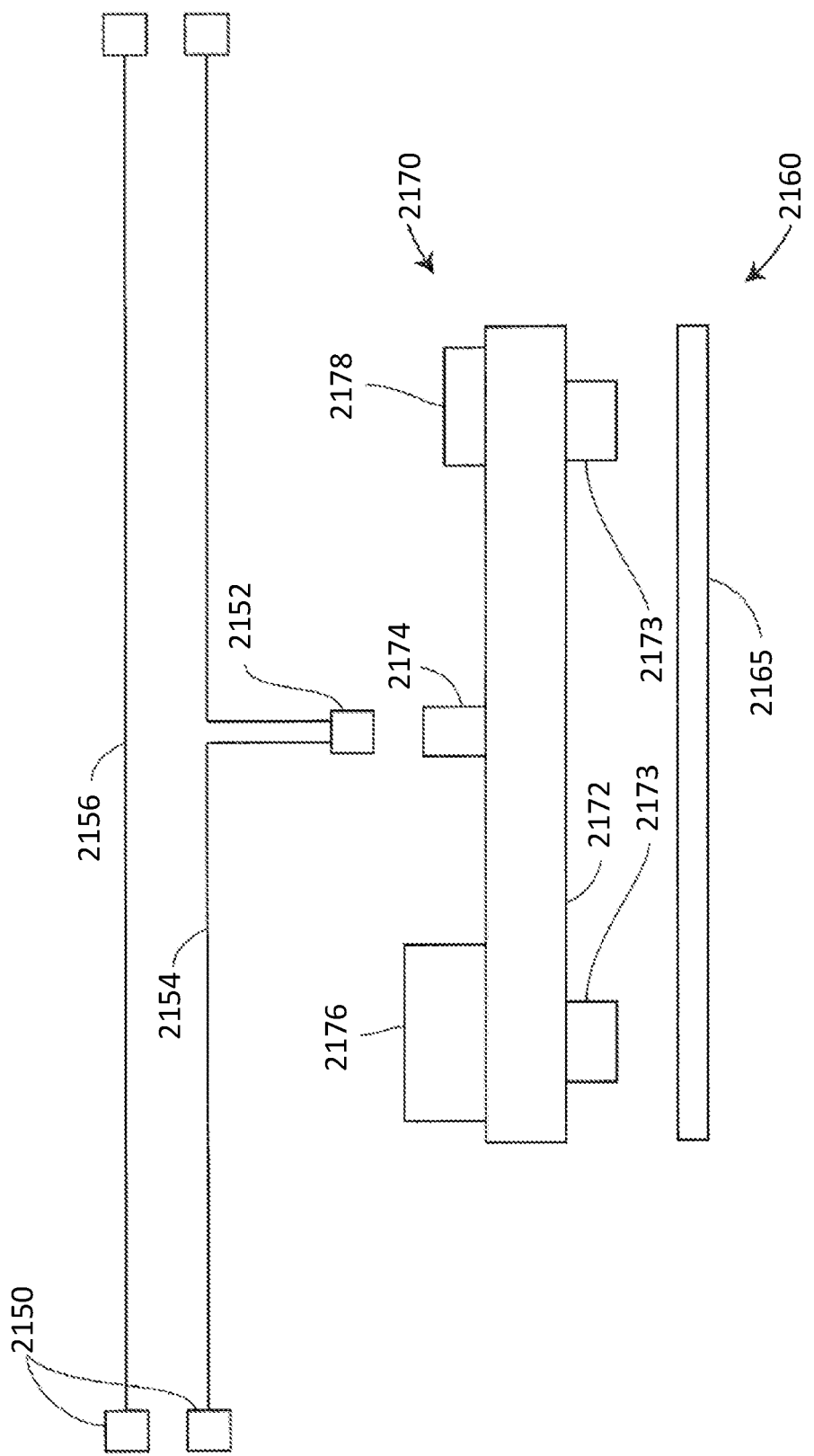
FIG. 3 is a block diagram of bus cables and their relation to encoder components according to an embodiment of the present invention.

In an embodiment illustrated in FIG. 3, angles of rotation of the axis assemblies 100, 200, 300, 400, 500, 600, 700 of the AACMM 10 are measured with angular transducers. In an embodiment, the angular transducers are angular encoders 2160, elements of which are illustrated schematically in FIG. 3. In an embodiment, an angular encoder 2160 includes an encoder disk 2165 and encoder electronics 2170. In an embodiment, encoder electronics 2170 includes an encoder printed circuit board (PCB) 2172, one or more read heads 2173, processor and support electronics 2176, temperature sensor connector 2178, and board connector 2174. In an embodiment, the encoder disk 2165 includes a collection of radially directed lines, the positions of which are sensed by the one or more read heads 2173 and the sensed positions processed with processor and support electronics 2176, to determine an angle of rotation of the encoder disk 2165 in relation to the read heads 2173. In an embodiment, each board connector 2174 is attached to a T-connector 2152 of a T-cable 2154 within the first bus 2182 (FIG. 2). Each encoder PCB 2172 connects to a corresponding T-cable 2154 of the first bus 2182. Cable connectors 2150 on each end of the T-cable 2154 attach to cable connectors 2154 on adjacent T-cables 2154 in the AACMM 10. In this way, angle information may be transferred from each angular encoder 2160 through the first bus 2182 to the main processor electronics 2040 for further processing. The transmitted angles are synchronized to the capture signal, which in an embodiment has a rate of around one kilohertz. By connecting a single T-connector 2152 to a corresponding single board connector 2174, the angular encoders 2160 continue to send their angle readings to the base processor electronics 2040 even if one or more of the encoder electronics 2170 are disconnected from the first bus 2182. In an embodiment, cable connectors 2150 are provided on each end of an interconnect cable 2156 of the second bus 2184 (FIG. 2). Cable connectors 2150 of adjacent interconnect cables 2156 are connected together to provide a continuous electrical path for the second bus 2184.

Figure 4A:
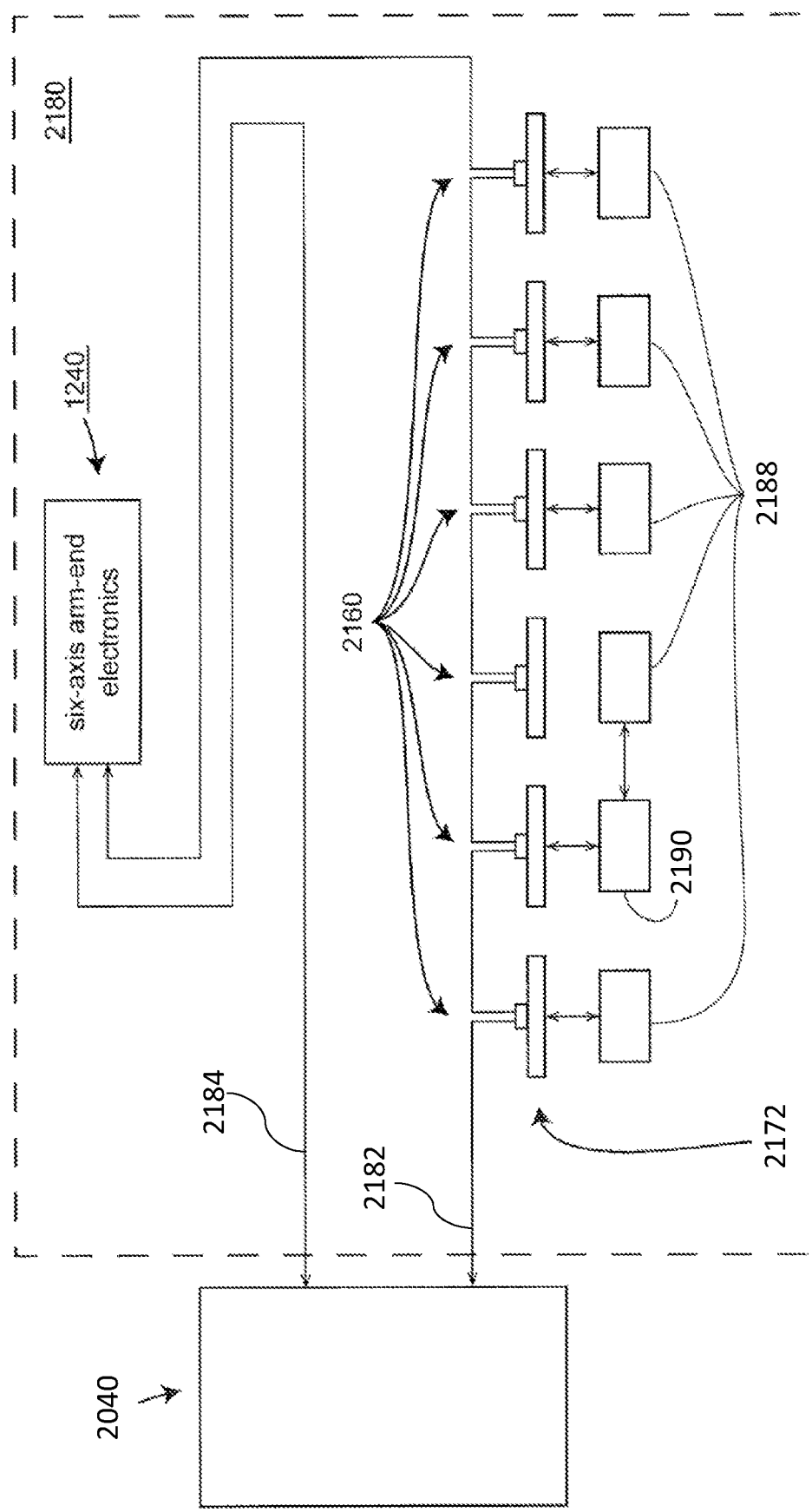
FIGS. 4A, 4B are block diagrams of interconnecting elements in six-axis electronics and seven-axis electronics according to an embodiment of the present invention.

FIG. 4A shows electrical elements 2180 in a six-axis AACMM. The electrical elements 2180 include six angular encoders 2160 attached by the first bus 2182 to the base processor electronics 2040 on one end, and to six-axis arm-end electronics 1240 on the other end. In an embodiment, one or more of the encoder PCBs 2172 are attached to an expandable temperature sensor 2190. When an expandable temperature sensor 2190 is attached to the temperature sensor connector 2178 (FIG. 3), a further temperature sensor 2188 may be attached to the expandable temperature sensor 2190. In an embodiment, some temperature sensors 2188 are not expandable. In an embodiment, at least one temperature sensor, either 2188 or 2190, is placed in the vicinity of each angular encoder to provide the possibility of compensating angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to six-axis arm-end electronics 1240.

Figure 4B:
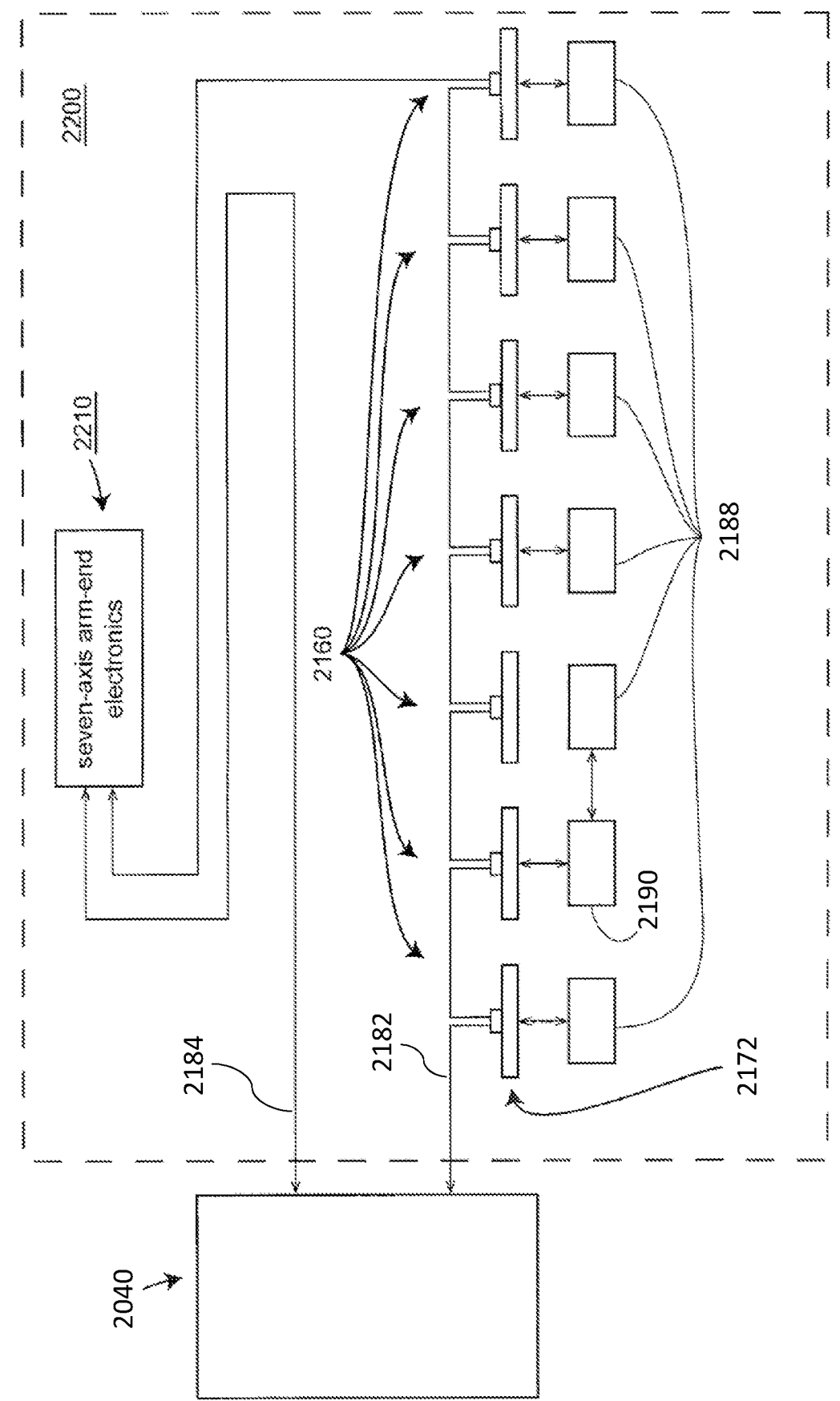

FIG. 4B shows electrical elements 2200 in a seven-axis AACMM. The electrical elements 2200 include seven angular encoders 2160 attached by the first bus 2182 to the base processor electronics 2040 on one end and to seven-axis arm-end electronics 2210 on the other end. In an embodiment, one or more of the encoder PCBs 2172 are attached to an expandable temperature sensor 2190. When an expandable temperature sensor 2190 is attached to the temperature sensor connector 2178, a further temperature sensor 2188 may be attached to the expandable temperature sensor 2190. In an embodiment, some temperature sensors 2188 are not expandable. In an embodiment, at least one temperature sensor, either 2188 or 2190, is placed in a vicinity of the angular encoders to allow for the compensation of angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to seven-axis arm-end electronics 2210.

Figure 5:
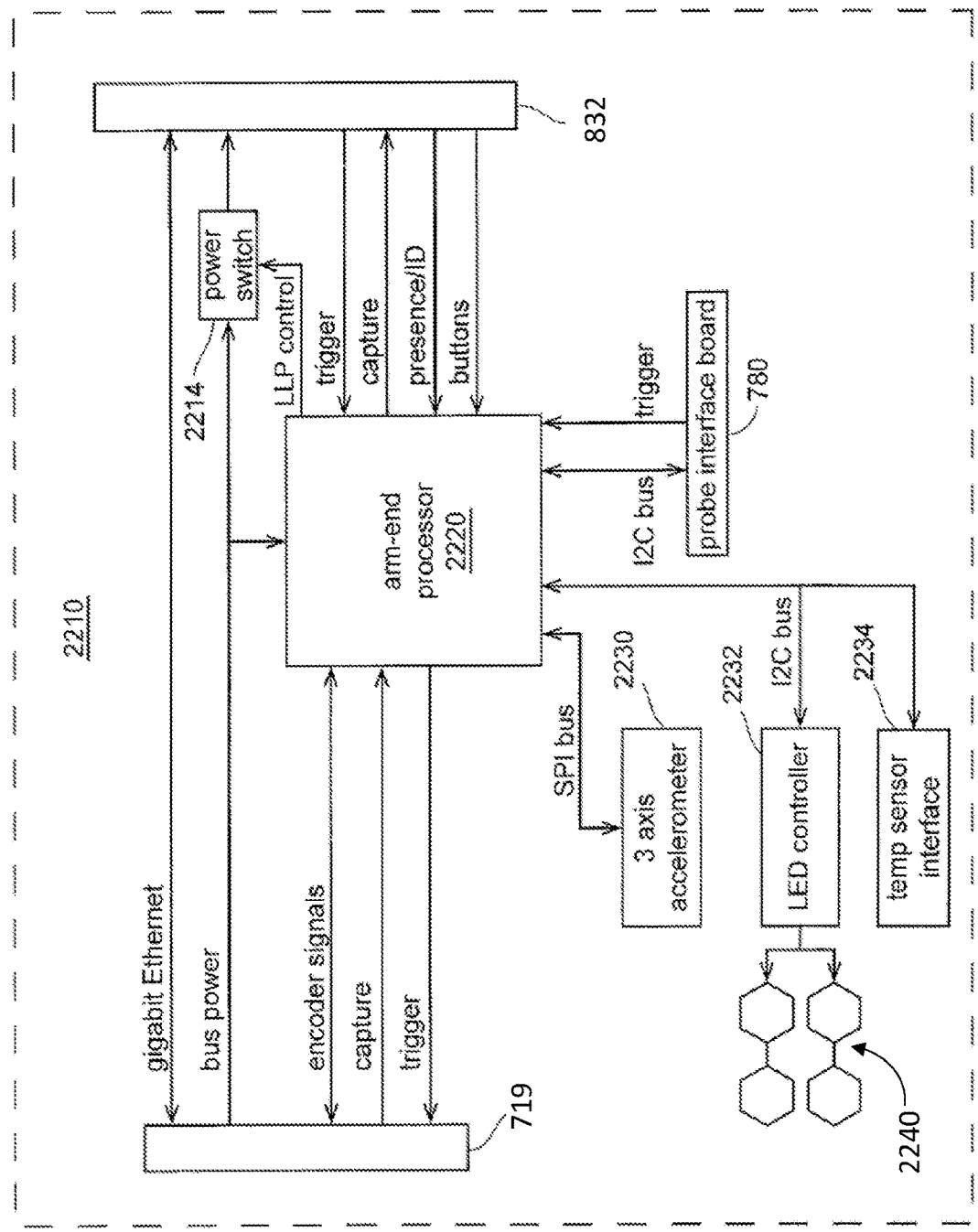
FIG. 5 is a block diagram of seven-axis arm-end electronics according to an embodiment of the present invention.

FIG. 5 is a block diagram of elements of the seven-axis arm-end electronics 2210. Bus connectors 719, also shown in FIG. 19F, include two electrical connectors that attach to cable connectors 2150 (FIG. 3) of the first bus 2182 (FIG. 2) and the second bus 2184 of the sixth-axis assembly 600. An arm-to-handle connector 832 in FIG. 5, and further shown in FIGS. 18B, 19H, connects to a handle-to-arm connector 1022 (FIG. 18D) of an accessory such as a laser line probe (LLP) 1100 as shown in FIGS. 24A, 24B or to a handle 1000 as shown in in FIGS. 18A, 18C, 18D, 18E. FIG. 5 includes a probe interface board 780, further illustrated in FIGS. 19C, 19F, 20A, 21A, 21B, 25A, 25D. The probe interface board 780 is configured to make electrical contact with removable tactile probes, as discussed further herein below. The probe interface board 780 communicates bidirectionally with the arm-end processor 2220 through an I2C bus. When a touch-trigger probe assembly 960 (FIG. 22D) is attached, the probe interface board 780 further sends trigger signals from the probe interface board 780 to the arm-end processor 2220.

In an embodiment, the seven-axis arm-end electronics 2210 includes an arm-end processor 2220 as shown in FIG. 5. In an embodiment, the arm-end processor 2220 is electrically connected to a three-axis accelerometer 2230 through a serial peripheral interface (SPI) bus. The three-axis accelerometer 2230 provides a record of severe impacts to the arm end. A record of such impacts may provide a clue to an origin of problems observed in service. In an embodiment, the three-axis accelerometer 2230 is included on a seven-axis arm-end board.

In an embodiment, the arm-end processor 2220 is further connected to a light-emitting diode (LED) controller 2232 through an I2C bus. In an embodiment, the LEDs 2240 are red-blue-green (RGB) LEDs that provide any of a plurality of colors within the visible spectrum. The LED controller 2232 provides control signals to the LEDs 2240 to control aspects such as emitted colors and light levels from the LEDs 2240. In an embodiment, the light emitted from the LEDs 2240 is controlled separately for each LED 2240 so that light emitted by the LEDs 2240 may be one color from an upper light diffuser and another color from a lower light diffuser of an end-effector assembly.

In an embodiment, the arm-end processor 2220 also communicates with a temperature sensor interface 2234 over an I2C bus. The temperature sensor interface provides a measured temperature that may be used to compensate for thermal expansion of elements attached to the end of the arm.

The arm-end processor 2220 receives a variety of electrical signals from the bus connectors 719 including bus power signals, encoder signals, capture signals, and trigger signals. The bus connector further provides bus power to the arm-to-handle connector 832 if a power switch 2214 is activated by an LLP 1100 control signal from the arm-end processor 2220. The LLP 1100 control signal is a signal provided by the LLP 1100 or other accessory indicating that it is connected to the AACMM 10 and should receive electrical power from the bus. Besides sending bus power to the LLP 1100 or other accessory device, the arm-to-handle connector 832 also transfers high-speed data from accessories such as the LLP 1100 over the second bus 2184 (FIG. 4A, 4B) to the first base processor 2042. In an embodiment, actuator or button presses may result in signals being transmitted the arm-to-handle connector 832 to the arm-end processor 2220 in response to pressing of a handle button 1010 shown in FIG. 7A. The capture signals are sent from the arm-end processor 2220 to the arm-to-handle connector 832 to synchronize measured values obtained from accessories such as the LLP 1100 with the angular readings obtained by the angular encoders in the arm-axis assemblies 100, 200, 300, 400, 500, 600, 700. In some cases an accessory may send a trigger signal to the arm-end processor 2220. An accessory device may also send a presence/ID signal indicating its presence and identity in the system.

FIGS. 6A, 6B show some elements of the lower arm. The mounting device 15 provides a way of a attaching the AACMM 10 to a mounting ring. The shock-absorber bumper 110 provides a way to cushion a potential drop of the AACMM 10 when affixing the arm to a mounting ring. The base 20 includes elements shown in FIGS. 6A, 6B such as a base cover 22, a control panel 30, a battery access 40, and a port panel 50. The control panel 30 includes the on-off button 32, the Wi-Fi button 34, the Bluetooth™ button 36, the first-battery indicator light 38, and the second-battery indicator light 39. The battery access 40 includes the first battery door 42, the first battery-door latch 43, the first battery-door hinge 44, the second battery door 46, the second battery-door latch 47, and the second battery-door hinge 48. The port panel 50 includes an Ethernet jack 52, a USB data-transfer port 54, a USB charging port 55, an auxiliary port 56, and a power supply port 58.

The construction and operation of the first axis assembly 100 may be similar to that described in U.S. Provisional Application 62/451,307 and U.S. Provisional Application 62/512,326, the contents of which are incorporated by reference herein. In an embodiment, the first-axis assembly 100 includes a first-axis cartridge and a first-axis yoke structure. The handle 125 and the shock-absorber bumper 110 are coupled to the first axis assembly 100. In an embodiment, in the first-axis cartridge, a first-axis shaft rotates about a first axis relative to a first axis housing. The first-axis cartridge includes an encoder board with read heads, a read-head plate, an encoder disk, a lower bearing, a preload bearing spacer, a wave washer, a first-axis housing, an upper bearing, and a first-axis shaft. The first-axis housing includes a lower lip against which the wave washer is placed.

FIGS. 6A, 6B also show some external elements of the second-axis assembly 200, including first-segment yoke, second-axis cap, cable cover, and cable-track. The construction and operation of the second-axis assembly 200 may be similar to that described in aforementioned U.S. Provisional Application 62/451,307 and U.S. Provisional Application 62/512,326. In an embodiment, the second-axis assembly 200 provides a hinge-type rotation about a second axis. In an embodiment, the second-axis assembly 200 also includes the counterbalance ring that provides a torque that lightens the downward force on arm segments held by an operator, thereby making it easier for an operator to support and maneuver the AACMM 10 in making measurements.

The wires of the first bus 2182 and the second bus 2184 (FIG. 4A) are routed through the first-axis assembly 100 and second-axis assembly 200 via slip rings. The bus wires 2182, 2184 continue as cables to pass through the third-axis assembly 300 and fifth-axis assembly 595 via slip rings, which are a part of the third/fifth cartridge. The construction and operation of the third-axis assembly 300 and fifth-axis assembly 500 may be similar to that described in aforementioned U.S. Provisional Application 62/451,307 and U.S. Provisional Application 62/512,326. In an embodiment, the third-axis assembly 300 and the fifth axis assembly 500 rotate about axis' that extend through the centerline of the first segment 295 and second segment 585 respectively.

The fourth/sixth-axis assemblies 400, 600 provide a hinge type rotation for the elbow 13 and wrist 14. The construction and operation of the fourth-axis assembly 400 and sixth-axis assembly 600 may be similar to that described in aforementioned U.S. Provisional Application 62/451,307 and U.S. Provisional Application 62/512,326. In an embodiment, the fourth/sixth-axis assemblies 400, 600 do not include a slip ring but rather route the wires therethrough. In an embodiment a slip ring is also not used on those second-axis assembly 200, the third-axis assembly 400, or the sixth-axis assembly 600 because the total amount of rotation is limited by the hinge movement of these assemblies.

Each of the assemblies 100, 200, 300, 400, 500, 600, 700 includes an encoder that measures the amount of rotation of the respective assembly. The encoders transmit a signal in response to the rotation. This signal allows the determination of the position of the probe assembly 900 with six-degrees of freedom.

In an embodiment, the AACMM 10 includes seven rotation axes, as shown in FIGS. 7A-7E. In another embodiment, the AACMM 10 includes only six rotation axes. In an embodiment illustrated in FIGS. 7A-7E, the seventh-axis assembly 700 includes a seventh-axis housing/yoke 702, a shaft, a seventh-axis slip ring, a probe latch 768, upper end-effector buttons 804, a seventh-axis circuit board, and a carrier. In an embodiment, the seventh-axis housing/yoke 702 attaches at one end to the the six-axis assembly 600. The construction and operation of the seventh-axis assembly 400 and sixth-axis assembly 600 may be similar to that described in aforementioned U.S. Provisional Application 62/451,307 and U.S. Provisional Application 62/512,326. In this attachment, the seventh-axis housing/yoke 702 serves a yoke function. The seventh-axis housing/yoke 702 couples to outer races of a rear bearing and to the outer races of a front bearing. The shaft 750 couples to inner races of the rear bearing 732 and the front bearing 736. In an embodiment, the shaft 750 rotates about a seventh axis 711 relative to the housing/yoke 702. In an embodiment, a wave washer 734 applies force to the outer race of the rear bearing 732. The inner race of the rear bearing 732 is press fit onto the shaft 750. This results in preload being applied to both the rear bearing 732 and the front bearing 736.

Figure 8A:
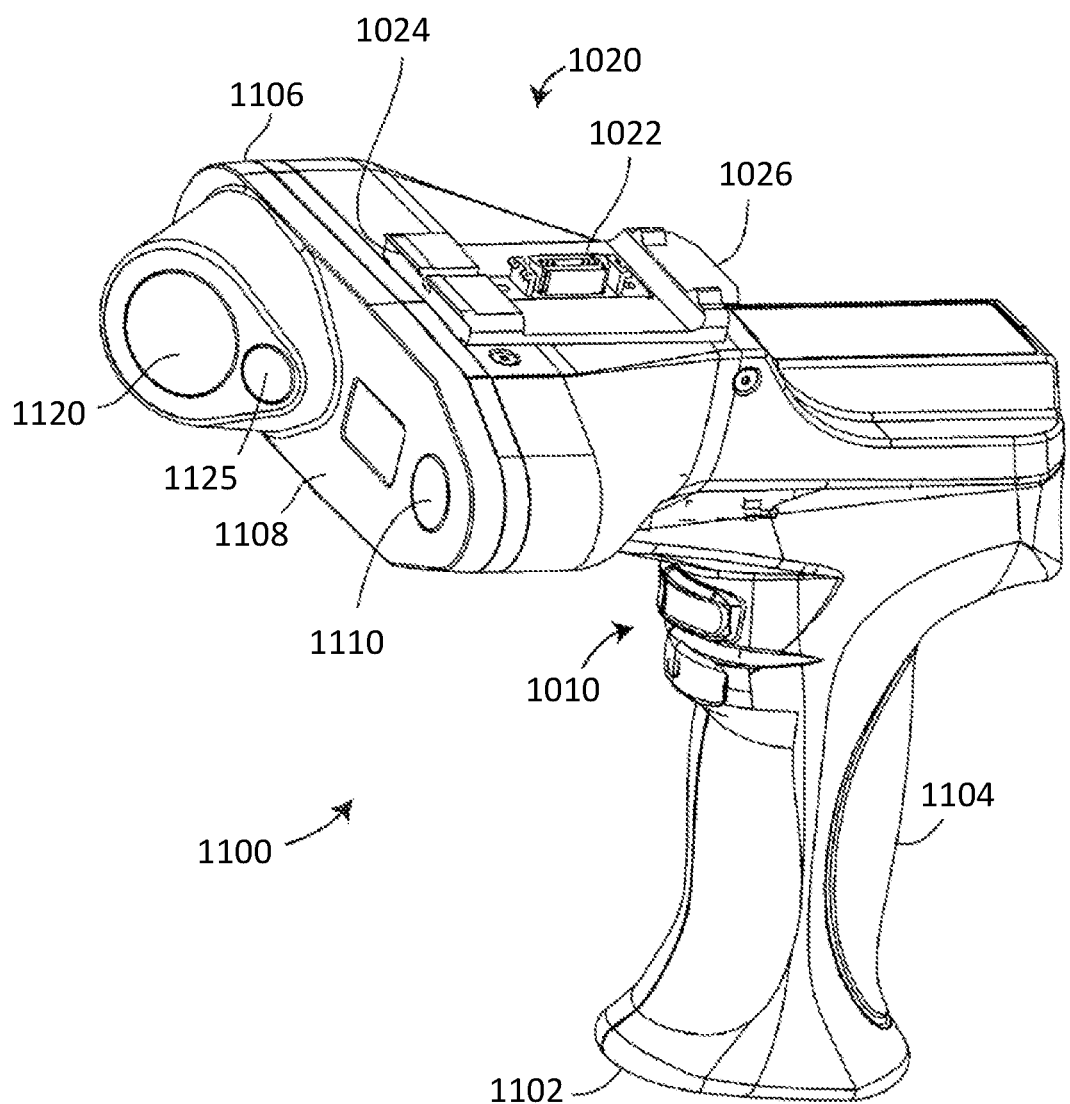
FIGS. 8A, 8B are isometric and partial section views, respectively, of a laser line probe according to an embodiment of the present invention.

The nut assembly 740 surrounds the housing/yoke 702 and the shaft at a central portion of the seventh-axis assembly 700. In an embodiment, the nut assembly 740 is coupled to a push shoe 802 (FIG. 18B). The purpose of the push shoe 802 is to either engage or release the removable seventh-axis cover 800, the handle 1000 (FIG. 7A), the LLP 1100 (FIG. 8A), or any other accessory attached to the seventh-axis assembly 700 in place of the seventh-axis cover 800. The nut assembly 740 provides a way of engaging or releasing the push shoe 802 while applying a consistent level of force to internal elements within the seventh-axis assembly 700. The result of this consistent level of force by the nut assembly 700 is to enable tactile probes and accessory measuring devices to be attached to the seventh-axis assembly 700 with a greater degree of consistency than would otherwise occur. In an embodiment, the nut assembly 740 reduces or eliminates the need to perform a compensation (also referred to as a calibration) on the tactile probe or other measuring device.

The seventh-axis assembly 700 may include one or more circuit boards. When a handle 1000 (FIG. 7A) or an LLP 1100 (FIG. 8A) is attached to the seventh-axis assembly 700, a arm-to-handle connector 1022 (FIGS. 7D, 7E) makes electrical connection between the handle 1000 or the LLP 1100 and the circuit boards. In an embodiment, an arm-end processor is included on the seventh-axis circuit board. Also included on the seventh-axis circuit board 820 are mechanical actuators that respond to actuation or presses by an operator of upper end-effector buttons 804. The hard-probe assembly 900 is one type of tactile probe. Other types of tactile probes, such as a touch probe for example, may also be used.

In an embodiment, the hard-probe assembly 900 is coupled to the seventh-axis assembly 700. The hard-probe assembly 900 includes a probe tip 904 that an operator holds in contact with an object to be measured. When a designated upper end-effector button 804 is pressed, the encoders in the seven-axis assemblies 100, 200, 300, 400, 500, 600, 700 send synchronized encoder readings to the base processor electronics 2040, the encoder readings being synchronized to the capture signal generated by the trigger and capture circuit 2058 of the base processor electronics 2040. These encoder readings are combined with other recorded characteristics of the AACMM 10 to calculate 3D coordinates corresponding to a center of the probe tip 904. By measuring a number of points on the surface of an object with the probe tip 904, and by knowing the radius of the probe tip, the 3D coordinates of the object surface can be determined.

Figure 7B:
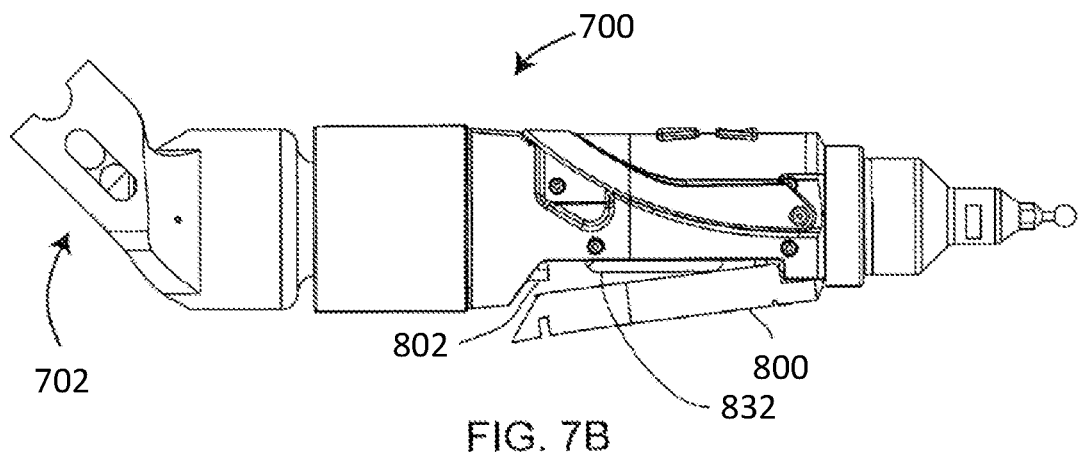
FIG. 7B is a side view of a seventh-axis assembly including a removable seventh-axis cover according to an embodiment of the present invention.

FIG. 7B illustrates the method in which the removable seventh-axis cover 800 is attached to the seventh-axis assembly 700. The push shoe 802 is drawn backward by rotating the nut assembly 740 to pull a clutch nut backward. This enables the removable seventh-axis cover 800 to be pushed into place, after which the push shoe 802 is pushed forward by rotating the nut assembly 740 in a direction that moves the clutch nut forward.

Figure 7C:
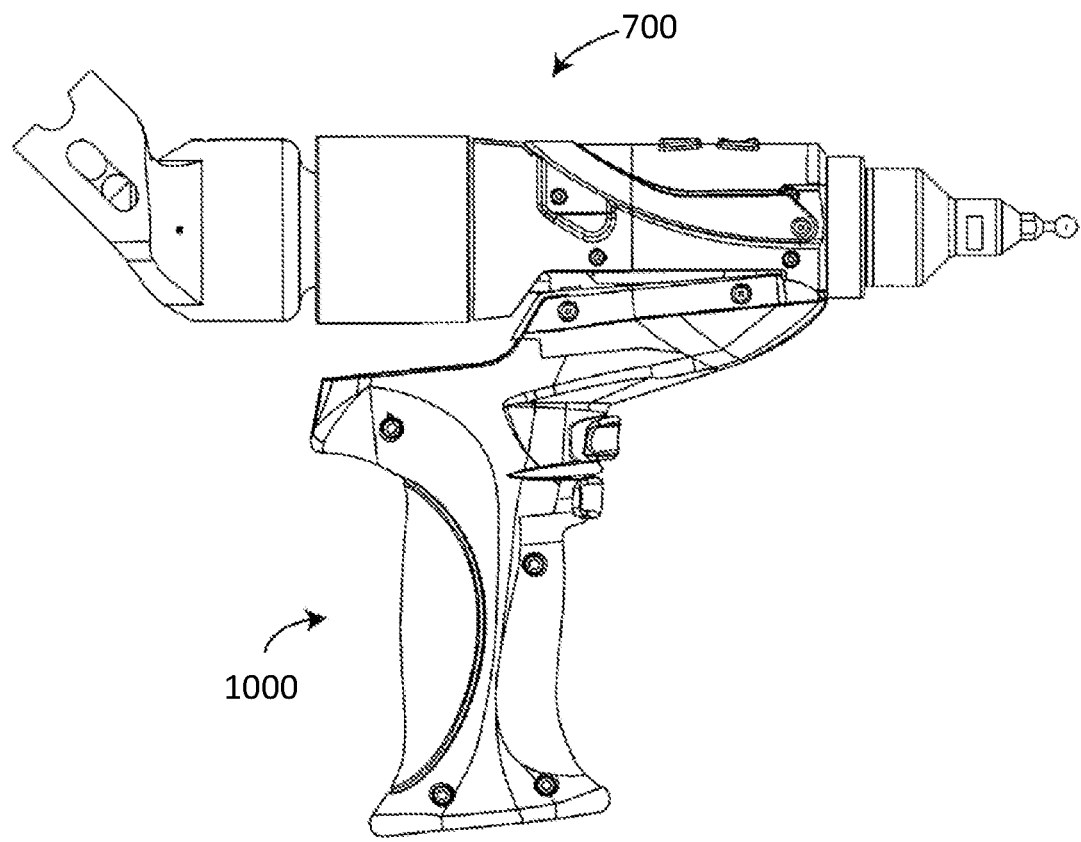
FIG. 7C is a side view of a seventh-axis assembly showing a removable handle being attached according to an embodiment of the present invention.
Figure 7D:
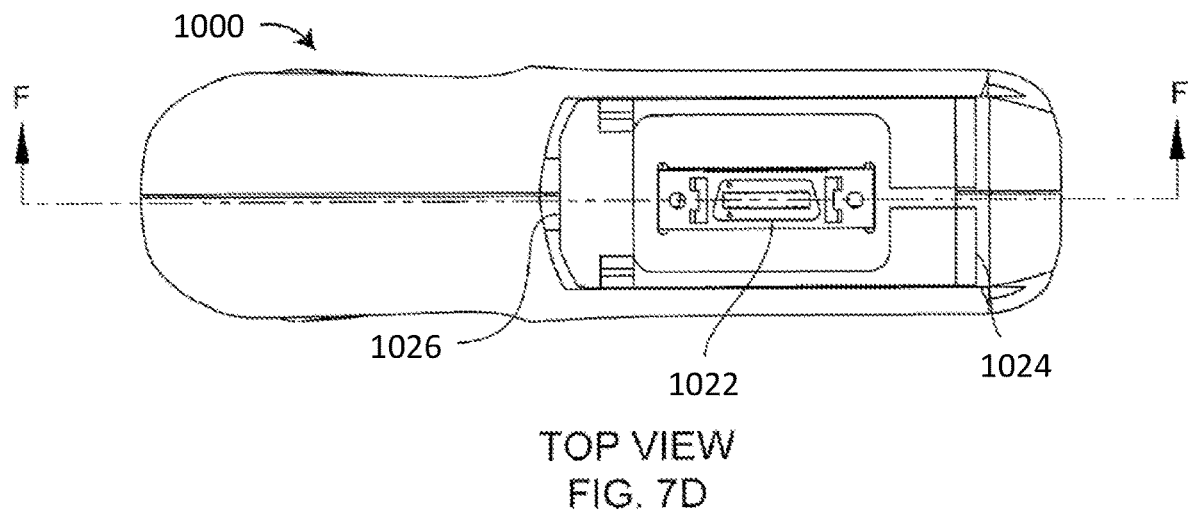
FIGS. 7D, 7E are a top view and a section view, respectively, of a removable handle according to an embodiment of the present invention.
Figure 7E:
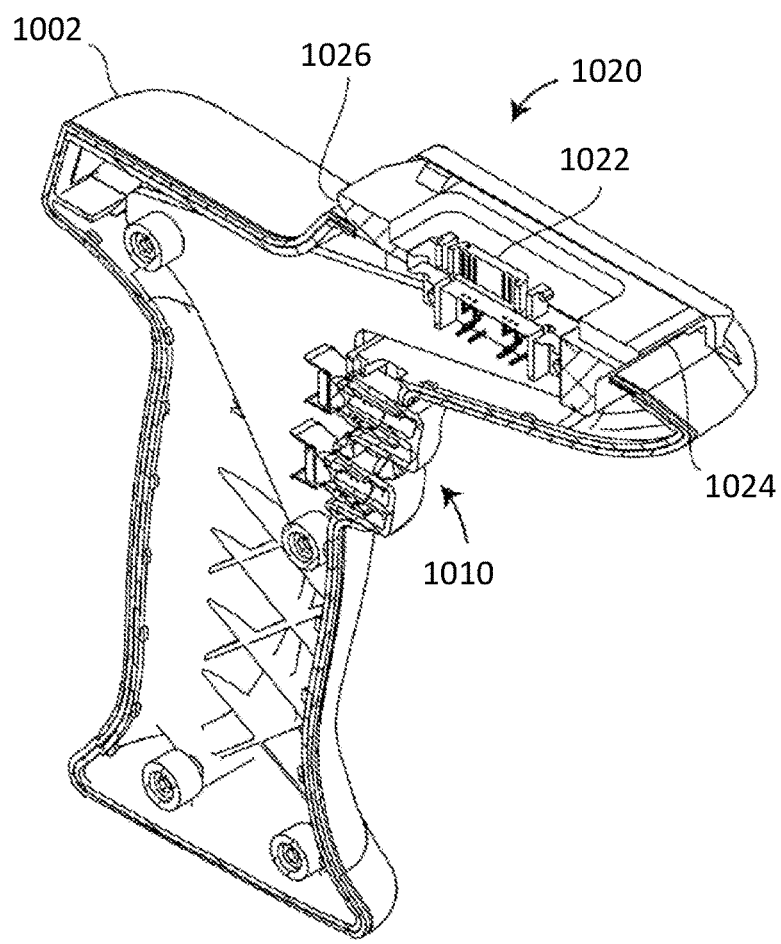

FIG. 7C illustrates the way in which the handle 1000 is attached to the seventh-axis assembly 700. After the removable seventh-axis cover 800 has been removed from the seventh-axis assembly 700, a forward grip-edge 1024 (FIG. 7D) of the handle 1000 is aligned to grip the seventh-axis assembly 700. The push shoe 802 is drawn backward by rotating the nut assembly 740 which results in the clutch nut being pulled backward. The handle 1000 and handle-to-arm connector 1022 of the handle 1000 (FIGS. 7D, 7E) are pushed against the seventh-axis assembly 700 to interlock the handle-to-arm connector 1022 with the arm-to-handle connector 832 (FIG. 7B). The push shoe 802 is pushed forward by rotating the nut assembly 740 in a direction that moves the clutch nut forward. As used herein, the forward direction is in a direction toward the probe tip 904. The push shoe 802 contacts the rear grip-edge 1026 (FIG. 7E), locking the handle 1000 in place. In an embodiment illustrated in FIG. 7E, wires from the handle buttons 1010 that are coupled to a handle frame 1002 send electrical signals through the handle-to-arm connector 1022 to the arm-to-handle connector 832 to the seven-axis arm-end electronics 2210 shown in FIG. 5.

In an embodiment, an AACMM 10 is a six-axis AACMM rather than a seven-axis AACMM. The six-axis AACMM includes a first-axis assembly 100, a second-axis assembly 200, a third-axis assembly 300, a fourth-axis assembly 400, a fifth-axis assembly 500, and a sixth-axis assembly 600. A six-axis AACMM is advantageous whenever the main use of the AACMM is to measure with a tactile probe. Usually a seven-axis AACMM is selected when an LLP 1100 will be used in addition to a tactile probe. For a six-axis AACMM, the seventh-axis assembly 700 is replaced with end-effector In accordance with an embodiment, an LLP 1100 is shown in FIGS. 8A, 8B, 9 and FIG. 10. In an embodiment, the LLP 1100 includes an interface 1020 that provides mechanical and electrical connection to the seventh-axis assembly 700. In an embodiment, the interface 1020 includes the forward grip-edge 1024, the rear grip-edge 1026, and the handle-to-arm connector 1022. To attach the LLP 1100 to the seventh-axis assembly 700, the seventh-axis cover 800 is first removed. The forward grip-edge 1024 of the LLP 1100 is aligned to grip the seventh-axis assembly 700 in a similar manner to that described with respect to FIG. 7C. The push shoe 802 is drawn backward (e.g. away from the probe tip 904 when it is installed) by rotating the nut assembly 740 to pull the clutch nut backward. The LLP 1100 and handle-to-arm connector 1022 of the LLP 1100 are pushed against the seventh-axis assembly 700 to interlock the handle-to-arm connector 1022 with the arm-to-handle connector 832. The push shoe 802 is pushed forward by rotating the nut assembly 740 in a direction that moves the clutch nut 741 forward (e.g. toward the probe end tip 904 when it is installed). The push shoe 802 contacts the rear grip-edge 1026, locking the LLP 1100 in place.

Figure 8B:
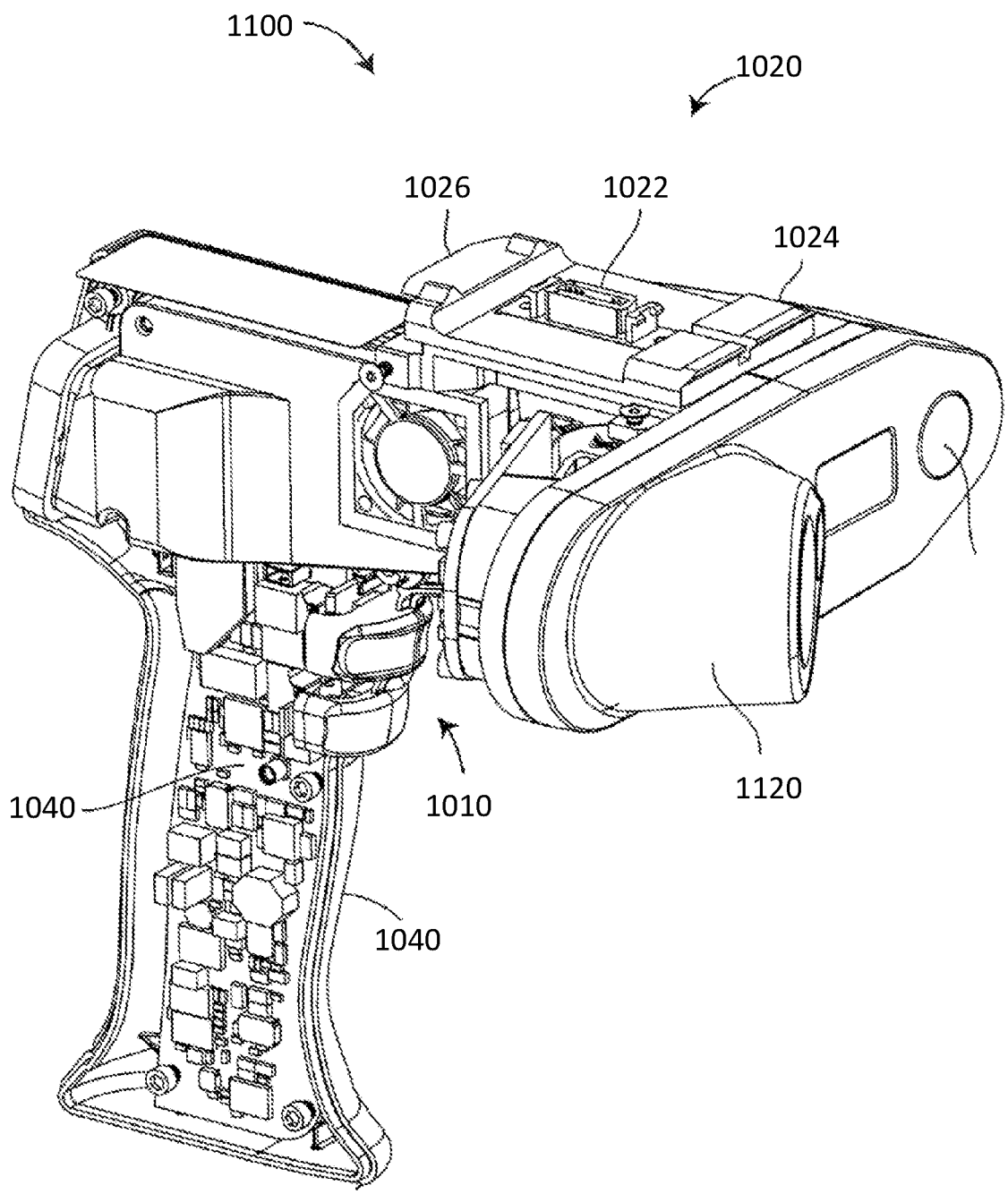

In an embodiment illustrated in FIG. 8B, wires from the handle buttons 1010 send electrical signals through the handle-to-arm connector 1022 to the arm-to-handle connector 832 to the seven-axis arm-end electronics 2210 shown in FIG. 5. In an embodiment, the high-speed signals obtained from a camera 1120 of the LLP 1100 pass through the handle-to-arm connector 1022 and the arm-to-handle connector 832 to pass by gigabit Ethernet (FIG. 5) to bus connectors 719 (FIG. 5). In an embodiment, the LLP 1100 includes a projector 1110 and a camera 1120 separated by a baseline distance and operable to perform a triangulation measurement to determine 3D coordinates of points illuminated by a line of laser light or a pattern of light, which might be laser light or another type of light. In an embodiment, the LLP 1100 further includes a marker light source 1125 that projects a visible beam of light that intersects a projected line of light in a spot, thereby indicating to a user a recommended position for locating an object to be measured. The camera 1120 and projector 1110 are included in a camera-projector portion 1106 that further includes an outer shell 1108. In an embodiment, the LLP 1100 is mounted on a handle 1104 that includes an enclosure 1102. In an embodiment, the elements of the LLP 1100, including the camera 1120 and the projector 1110 are supported by electronics, including a controller 1040. In an embodiment, some electronics that support processing of collected LLP data is included in the handle 1104. As will be discussed in more detail herein, the LLP 1100 is configured to acquire color information about the surface using a single camera 1120.

Figure 8C:
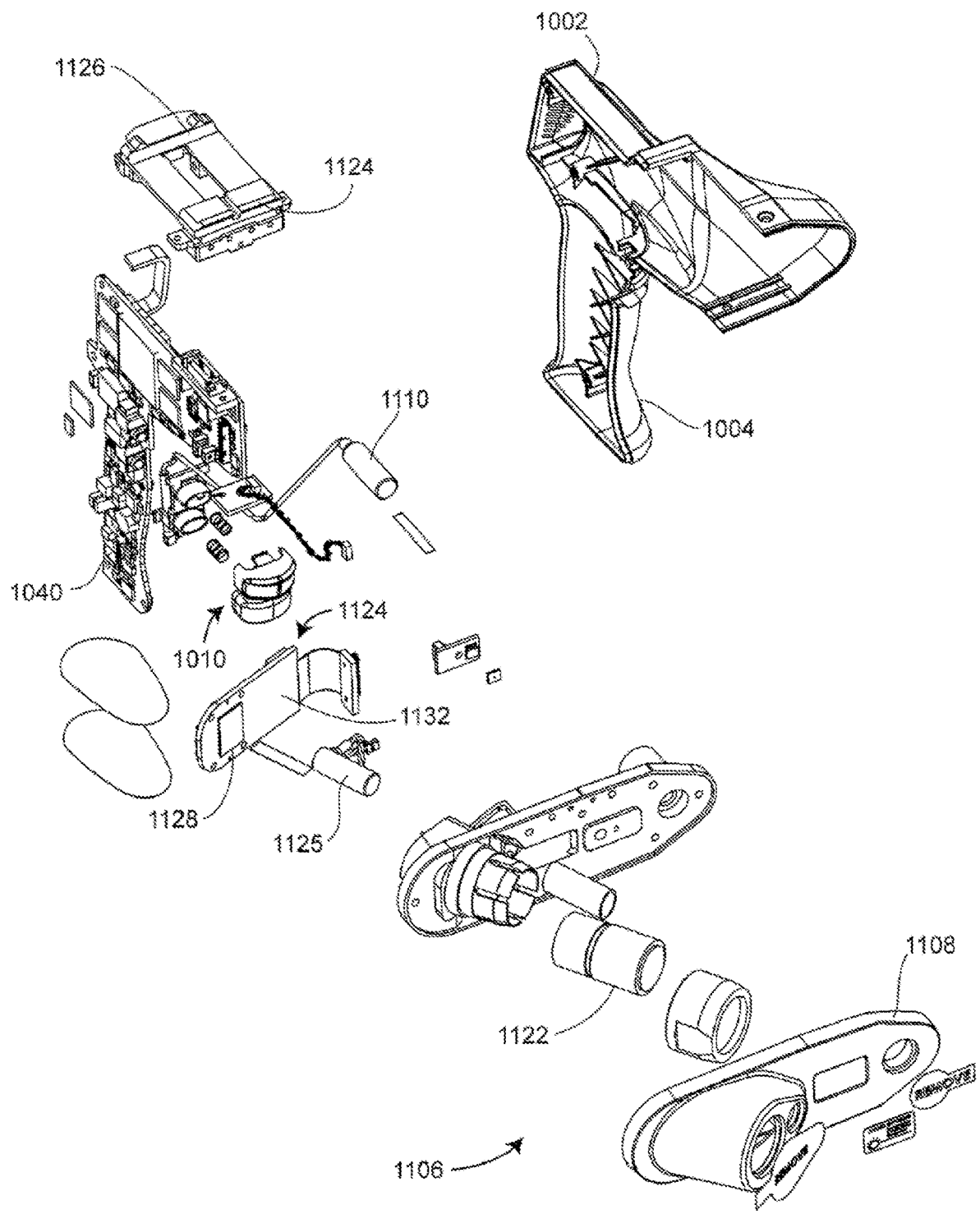
FIG. 8C is a partial unassembled view of a laser line probe according to an embodiment of the present invention.
Figure 9A:
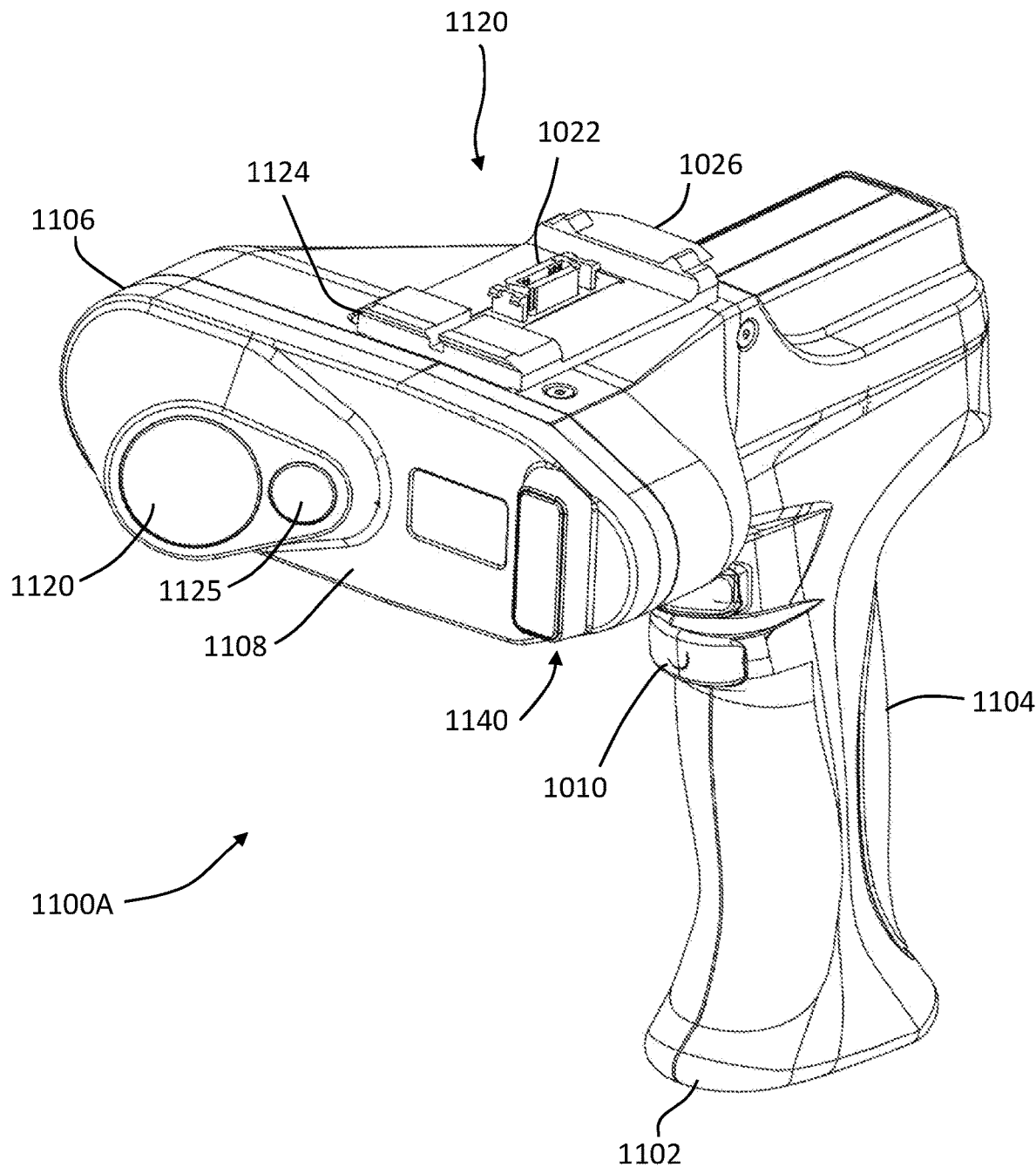
FIG. 9A, 9B, 9C, FIG. 9D, FIG. 9E and FIG. 9F are views of a laser line probe according to another embodiment of the present invention.
Figure 9B:
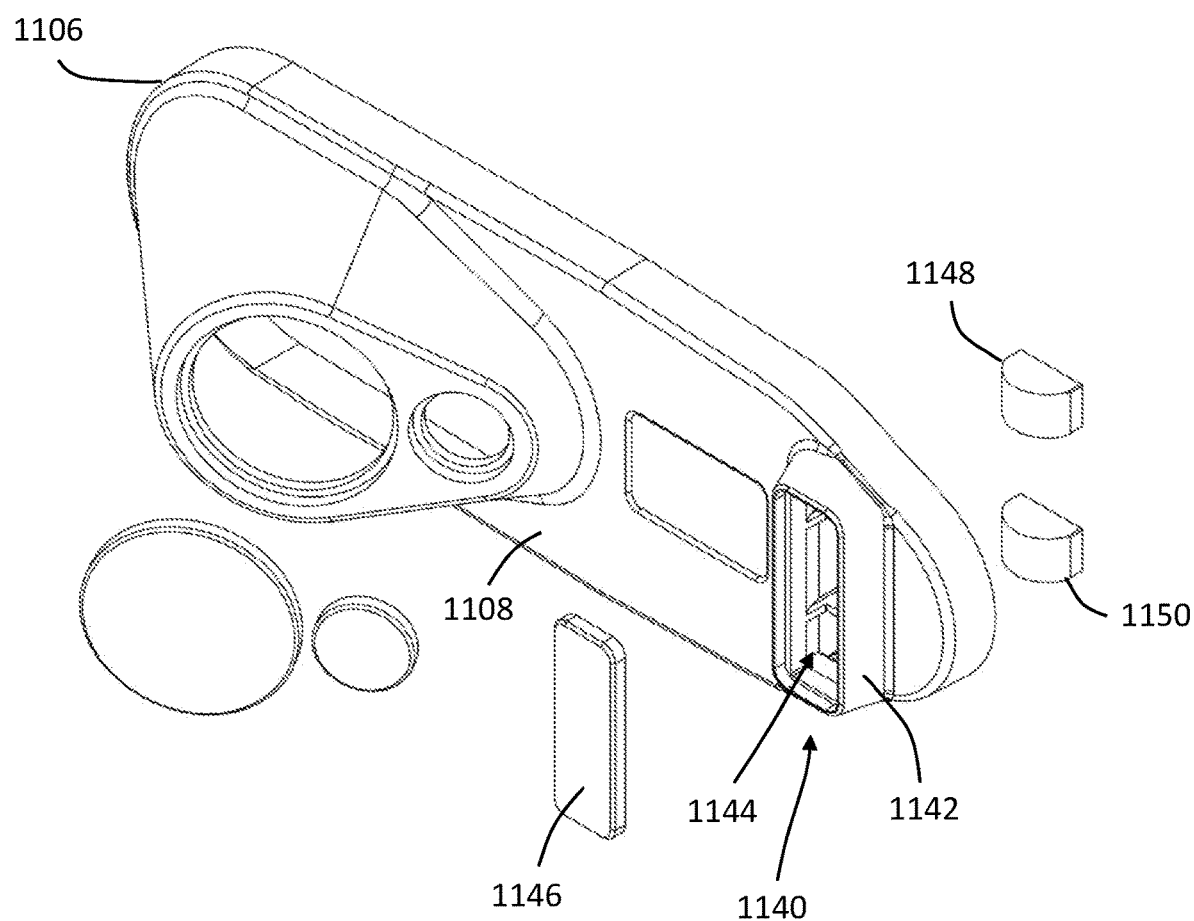
Figure 9C:
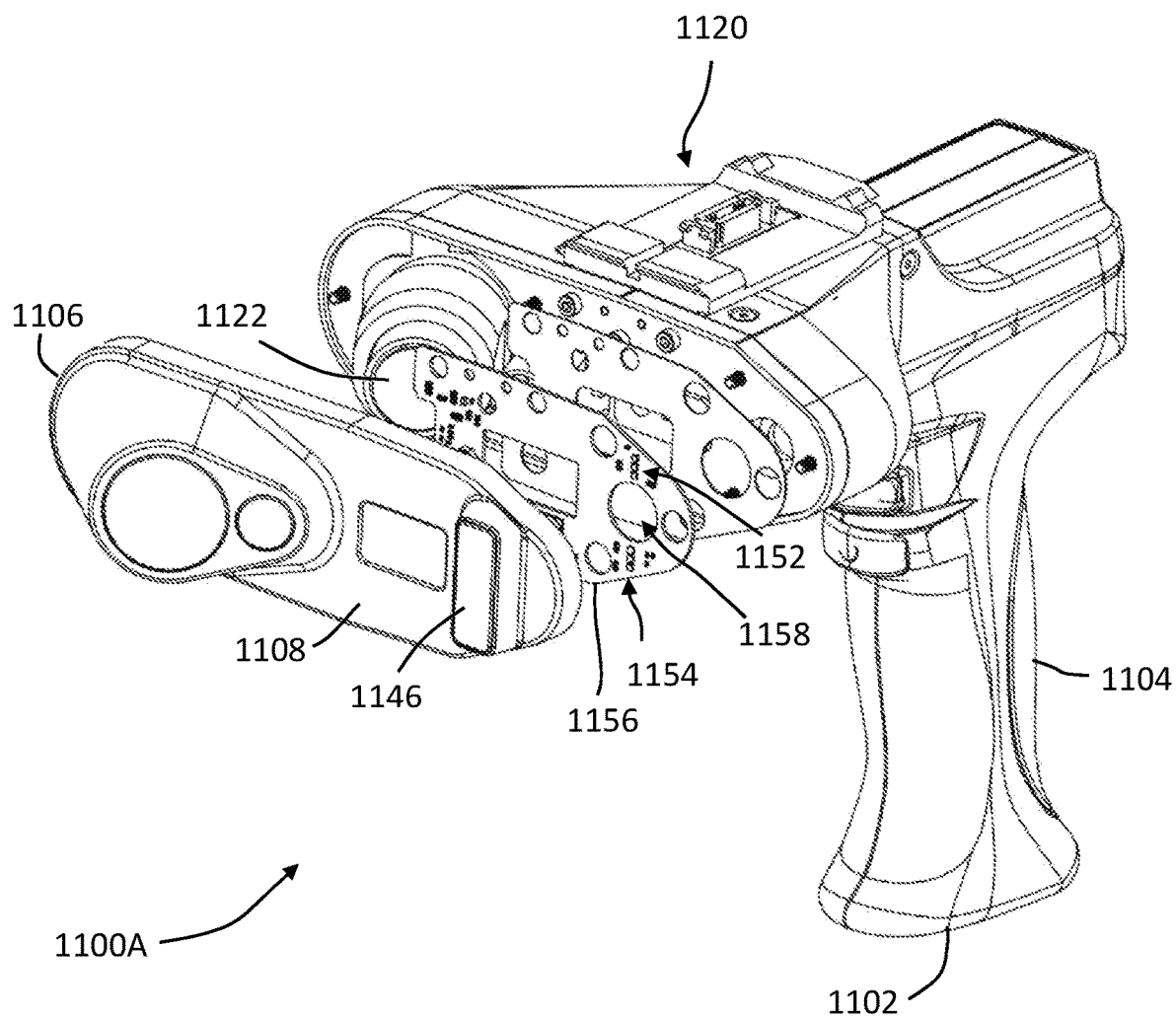
Figure 9D:
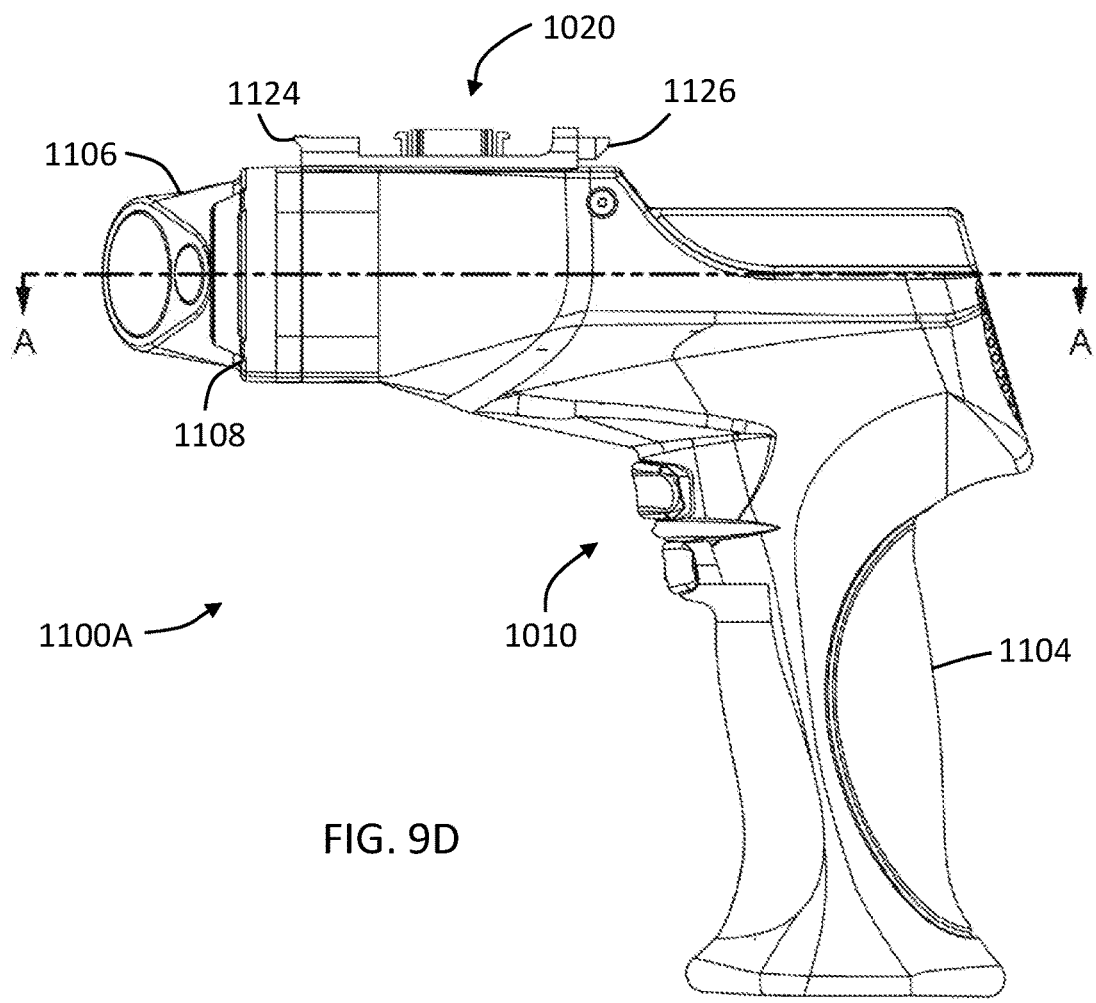
Figure 9E:
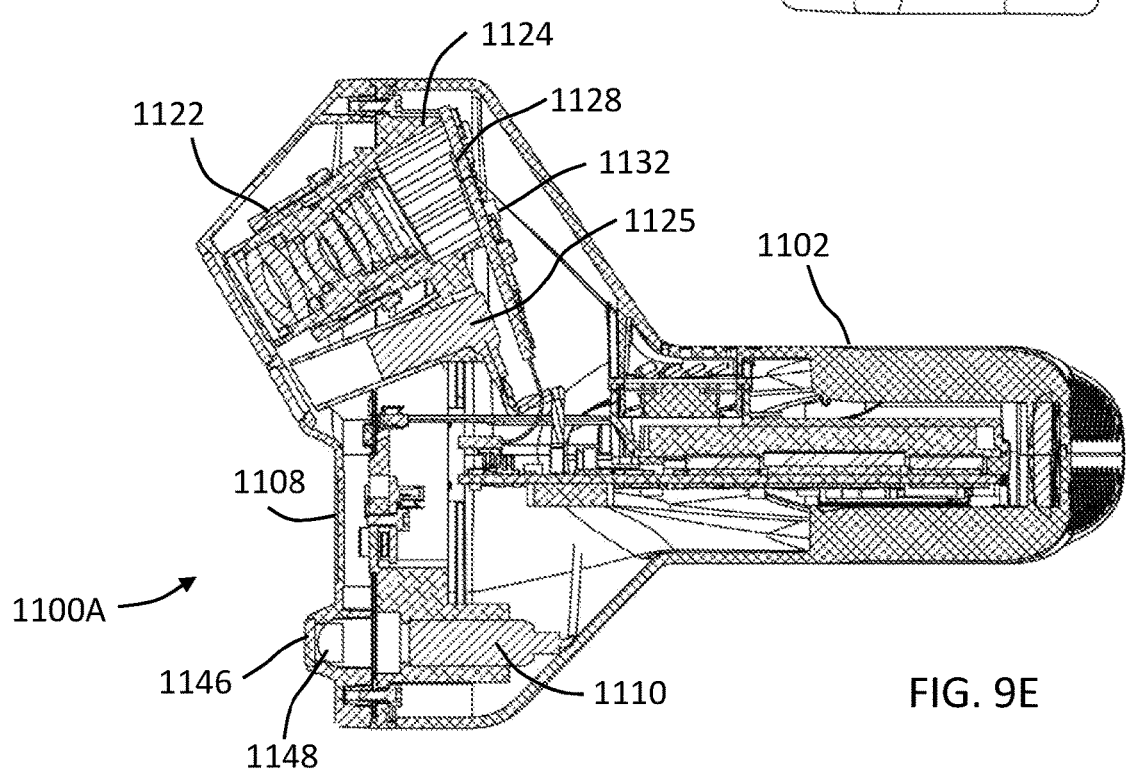
Figure 9F:
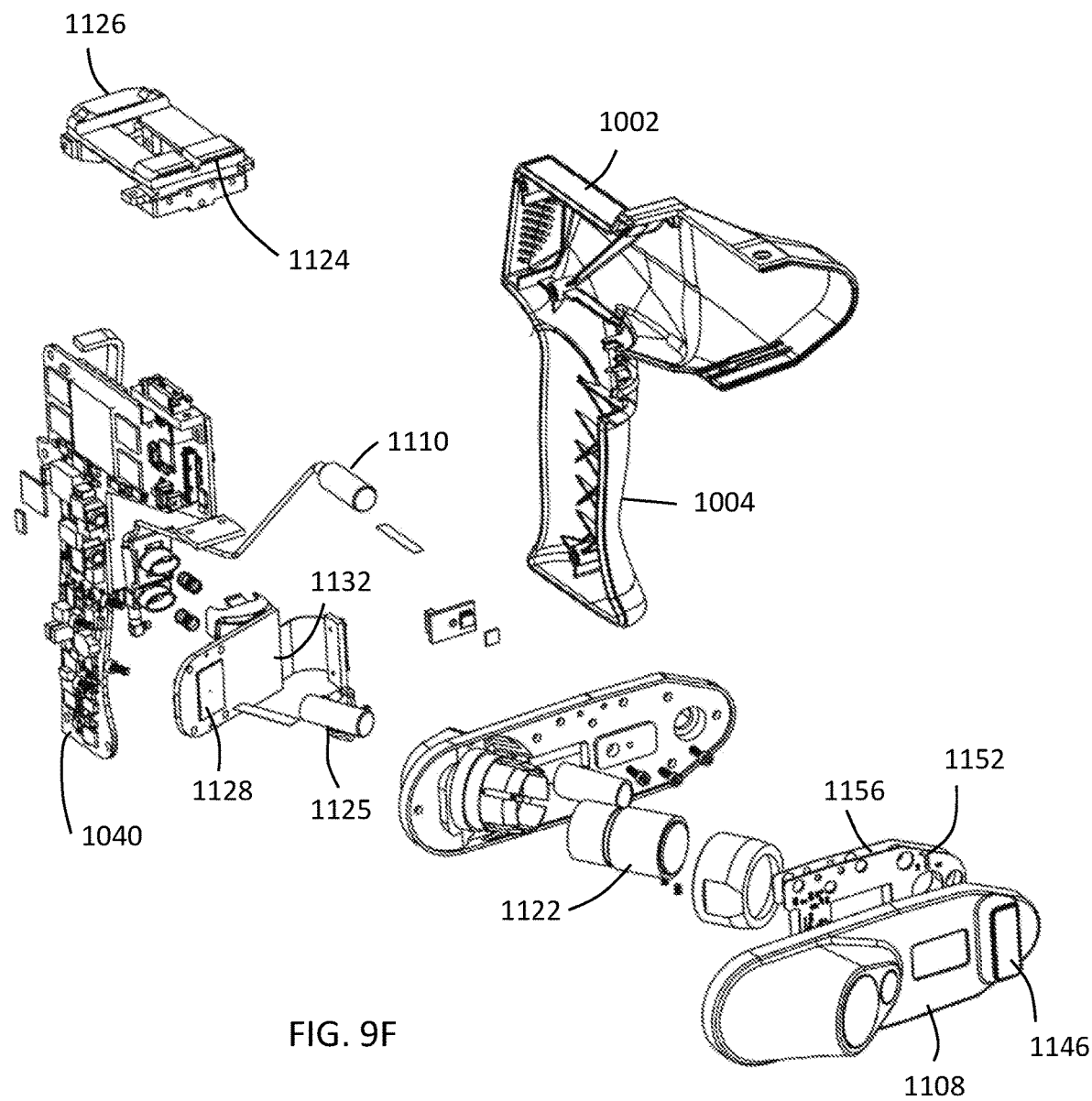

Referring now to FIG. 9A-9F, another embodiment is shown of a laser line probe 1100A. The laser line probe 1100A is similar to LLP 1100 of FIG. 8 except with the incorporation of a light source 1140 mounted on the outer shell 1108. In the illustrated embodiment, the outer shell 1108 includes a raised portion 1142 that defines an opening 1144. In an embodiment, the raised portion has a rectangular shape. The opening 1144 is covered by a lens 1146 that covers the projector 1110 and a pair of lenses 1148, 1150. In the illustrated embodiment, the lenses 1148, 1150 are cylindrical lenses with a 6 mm focal length Disposed behind the lenses and arranged to direct light into the lenses 1148, 1150 are two light sources 1152, 1154. In the illustrated embodiment, the light sources 1152, 1154 are light emitting diodes (LED) mounted to a control board 1156. The control board 1156 is coupled to the outer shell 1108. The control board 1156 is a printed circuit board that includes the driving electronics for the LEDs. In the illustrated embodiment, the light sources 1152, 1154 are configured to emit light at a predetermined wavelength, e.g. white light (approximately 400 nm-700 nm) for example. It should be appreciated that the light sources 1152, 1154 may also be configured to emit light at other predetermined wavelengths.

In an embodiment, the projector 1110 is arranged to emit light through a gap 1158 between the light sources 1148, 1150. During operation, the light from projector 1110 extends through the lens 1146 and onto the surface of the object. As described herein, in operation the light sources 1148, 1150 are illuminated on a continuous, periodic or aperiodic basis to emit light onto the surface being measured to allow color data to be acquired by the photosensitive array 1128.

Figure 10:
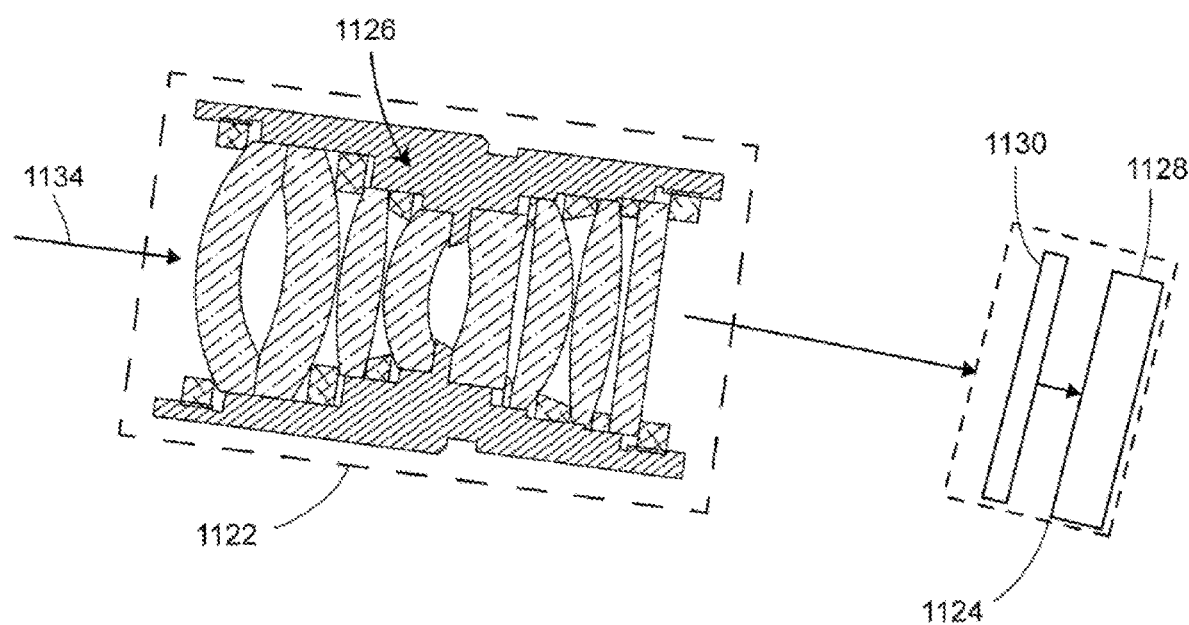
FIG. 10 is a partial cross-sectional view of a camera portion of a laser line probe according to an embodiment of the present invention.

Referring now to FIG. 10, with continuing reference to FIG. 8A-8C FIG. 9A-9F, an exemplary camera 1120 that is operable to acquire both metrology (3D coordinates) and color data of a scanned surface. In the exemplary embodiment, the camera 1120 is comprised of a lens assembly 1122 and a sensor assembly 1124. The lens assembly 1122 includes a plurality of individual lens' 1126. In one embodiment, the sensor assembly 1124 includes a photosensitive array 1128, a color filter array 1130 and a camera control circuit 1132. In an embodiment, the camera control circuit 1132 is coupled for communication with controller 1040.

In an embodiment, the filter 1130 is a Bayer type filter. A Bayer filter is a color filter array for arranging RGB color filters on a square grid of photosensors, such as that shown in FIG. 11I. In the exemplary embodiment, the Bayer filter 1130 has a filter patter of 50% green, 25% red and 25% blue. As discussed in more detail herein, the Bayer filter 1130 in combination with the photosensitive array 1128 allows for the acquisition of color data for the surface being scanned. In other embodiments, the Bayer filter and photosensitive array are replaced with a multi-spectral or hyper-spectral image sensor. In still other embodiments, a color filter array other than a Bayer filter may be used with the visible spectrum, such as a Fovean filter for example The lens assembly 1122 forms an image of the incoming light 1134 onto a photosensitive array. Typically in laser line probe cameras a band pass filter, such as a 150 nm band pass filter, is included to reduce stray/unwanted light. It should be appreciated that the band pass filter removes wavelengths of light that would prevent the acquisition of some color data by the photosensitive array. In one embodiment, the lens assembly 1122 does not include the band pass filter typically found in laser line probe cameras. In another embodiment, the lens assembly 1122 includes a 20 nm band pass filter.

In an embodiment, the camera 1120 cooperates with the projector 1110 in the acquisition of metrology data, e.g. three-dimensional coordinates of points on the surface of the object being scanned. It should be appreciated that unlike a prior art laser line probes which used light from a narrow bandwidth of light wavelengths, the sensor assembly 1124 can receive light over a broad spectrum of light wavelengths. In one embodiment, the filter 1130 has twice as many green pixels as blue and red. In this embodiment, the light source of the projector 111 emits a light in the green light spectrum (e.g. 495 nm-570 nm). In one embodiment, the projector is configured to emit light at 532 nm wavelength. This allows the light to be received by the green pixels of the sensor assembly 1124. As discussed in more detail below, the values for the red and blue pixels are then estimated using interpolation. In some embodiments, the interpolation may be a simple interpolation based on adjacent pixels. In other embodiments, the interpolation may be a demosaicing algorithm (sometimes referred to as a DeBayer algorithm). Further, as discussed in more detail below, the acquisition of metrology data may be interleaved with obtaining color data allowing the acquisition of metrology data and color data with a single camera 1120.

Figures 11, 12:
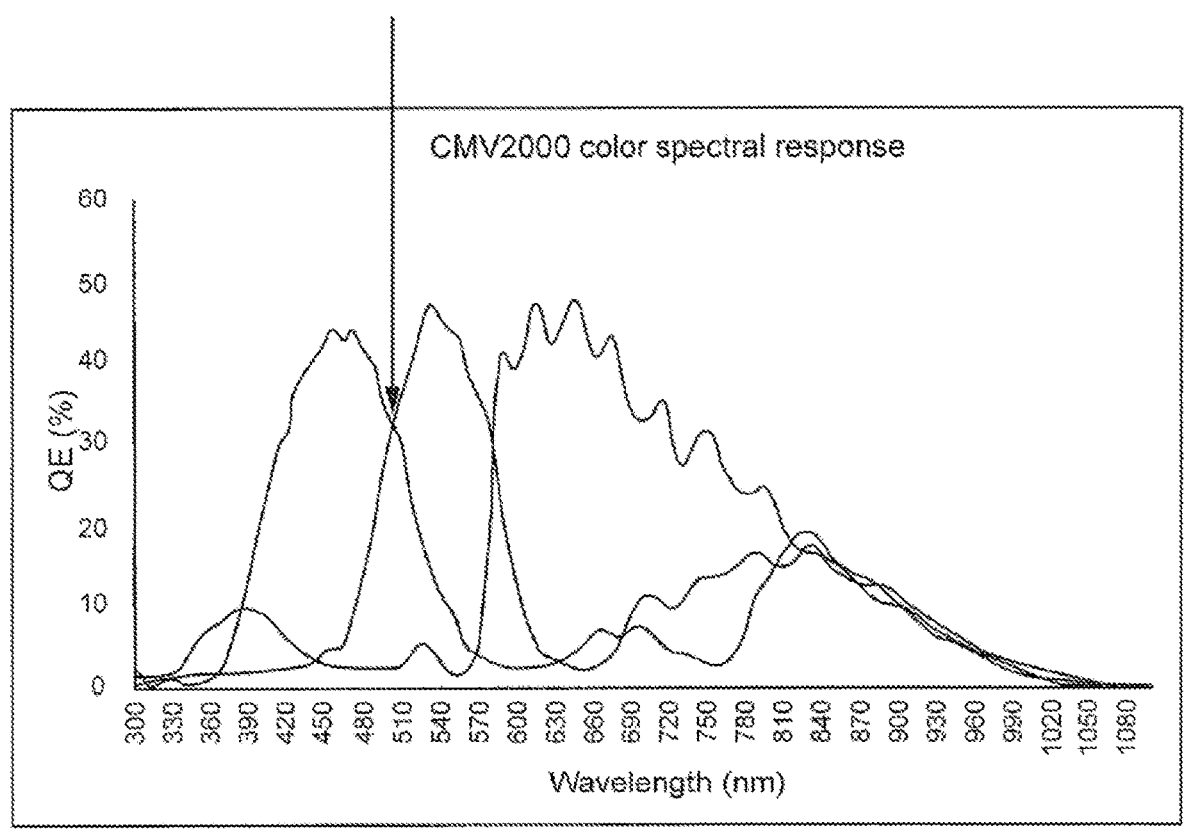
FIG. 11 is a schematic view of a filter for the photosensitive array according to an embodiment of the present invention.
FIG. 12 is a plot of color spectral response of a photosensitive array according to an embodiment of the present invention.

In another embodiment, the projector 1110 has a light source configured to emit light in the blue light spectrum of 450-495 nm. In an embodiment, the projector 1110 emits light at 450 nm. The use of blue light may be advantageous in some applications in reducing speckle. In this embodiment, the sensor assembly 1124 determines metrology data using only the blue pixels, thus only 1 in 4 (25%) of the pixels are used. In some embodiments, the light values of the green and red pixels are then estimated by interpolation In another embodiment, the projector 1110 has a light source configured to emit a light at a wavelength to which both the green pixels and the blue pixels are sensitive. As shown in FIG. 12, it should be appreciated that by emitting light in the 500 nm-530 nm spectrum (e.g. cyan), 75% of the pixels may be used to determine metrology data. In an embodiment, the projector 1110 emits light at 510 nm. In another embodiment, the projector 1110 emits light at 515 nm. In still another embodiment, the projector 1110 emits light at 520 nm.

In still another embodiment, the projector 1110 has a light source, such as light sources 1148, 1150 for example, configured to emit white light. In other words a light containing a broad spectrum of wavelengths, such as between 380 nm-750 nm. In an embodiment, the white light source is a light emitting diode (LED). The white light source may be combined with an imaging array, such as a liquid crystal diode (LCD), a digital light projector (DLP), a liquid crystal on silicon (LCOS) for example, to generate a white line of light. In another embodiment, the projector 1110 includes an RGB laser light source. An RGB laser is a light source that includes three modules, one each for a red light wavelength, a green light wavelength and a blue light wavelength. The three modules may be aligned to emit light on a common optical axis. In one embodiment, the light source is a single optical module with 3 different diodes. In either embodiment, the RGB laser has three discrete monochromatic wavelengths. The light emitted by the three laser modules is combined together to generate a white light source. In another embodiment, the light source includes light emitting diodes rather than generating laser light.

By using white light, all of the pixels of the sensor assembly 1124 (e.g. green, red and blue pixels) could be used to determine metrology data, therefore no interpolation is performed. Further, both metrology data and color data may be acquired simultaneously and no interleaving is performed. The use of white light may further allow for a more precise location of the center of the COG of the projected line (+/−1 pixel). Further, the use of an LED light source may eliminate speckle, which would further increase accuracy. It should be appreciated that the imaging lens 1122 may be different in an embodiment having a white light source when compared to one having a discrete (small wavelength band) light source.

In an embodiment, the color image is acquired by camera 1120 based on ambient light in the environment. In another embodiment, one or more lights, such as LED lights, xenon lights, high-intensity discharge (HID), or digital light projector (DLP) based lights are coupled to the outer shell 1108 and arranged to direct light onto the surface of the object. The lights may be arranged as a light bar or a light ring for example. In one embodiment, the light ring is disposed about the outer lens of the camera 1120. The lights project white light onto the surface of the object to increase illumination of the object during the color image frames. In an embodiment, the lights may be on continuously. In another embodiment, the lights may be pulsed or flashed in coordination with the acquisition of the color image. For example, in an embodiment, multiple metrology image frames may be acquired for each color image frame (e.g. 3 to 1). In such a case, the lights are turned on in coordination with the color image acquisition and turned off for the metrology image frames.

Figure 13:
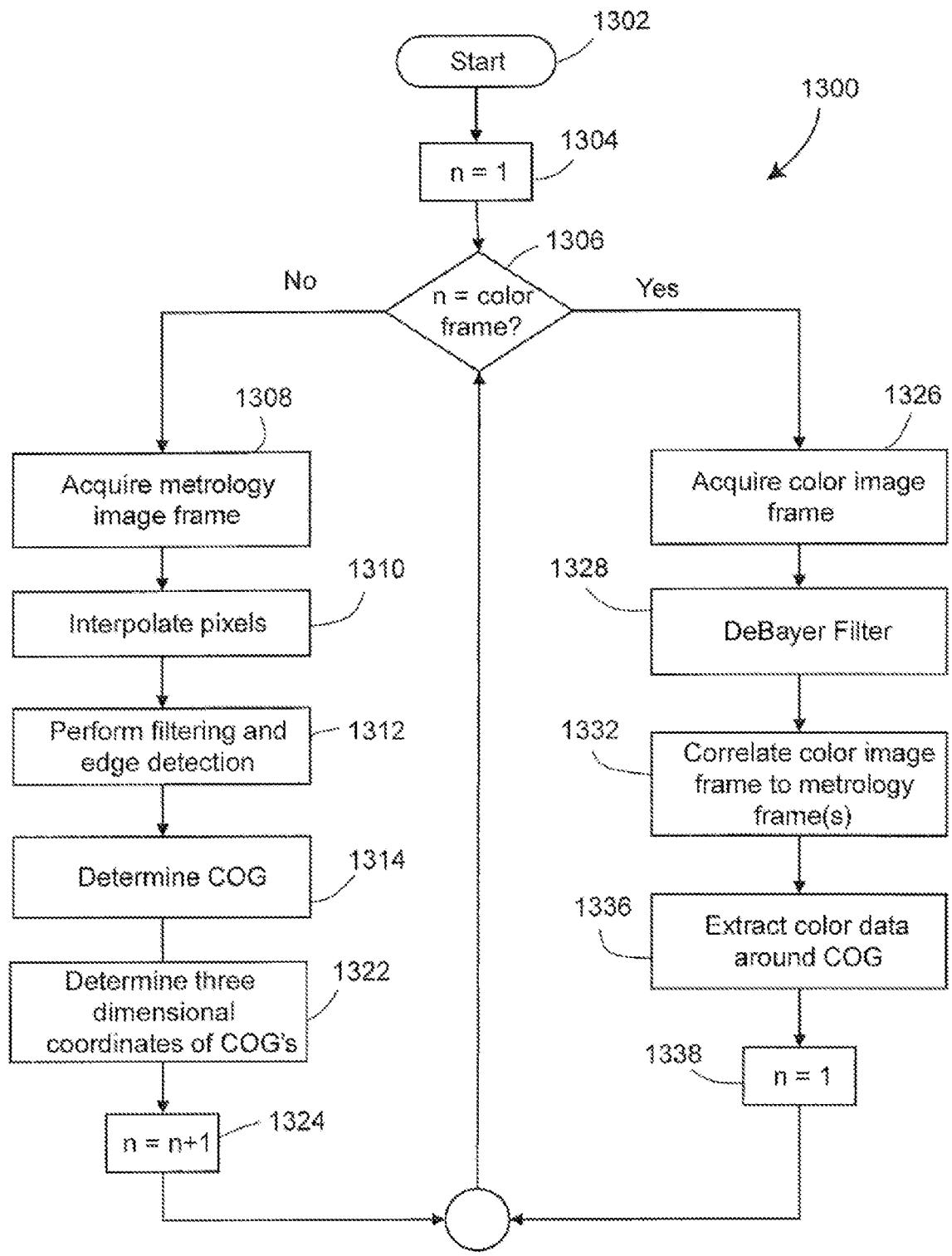
FIG. 13 is a flow diagram of a method of operating the laser line probe according to an embodiment.

Referring now to FIG. 13, an embodiment of a method 1300 of acquiring color data and metrology data with a laser line probe 1100 having a single camera 1120. In an embodiment, the ratio of metrology image frames acquired to the number of color images acquired may be either predetermined (e.g. 1:1, 2:1, n:1) or may be user selected. For example, a user who desires higher quality of color determination may select a lower ratio (e.g. 1:1 or 2:1), while a user who desired speed of acquiring metrology data may select a higher ratio (e.g. 4:1). For purposes of describing the method 1300, the ratio may be any ratio 1:n It should be appreciated that this ratio defines the amount of interleaving that is performed.

The method 1300 starts in block 1302 and proceeds to block 1304 where the interleaving ratio (metrology image frames per color image frames) is defined and a counter is set to 1. The method 1300 then proceeds to query block 1306 where it is determined if the current value of the counter n is equal to a color frame. For example, if the interleaving ratio is 3:1, then when the counter is equal to 3, the query block 1306 will return a positive, if it is less than 3 then the query block returns a negative.

When the query block 1306 returns a negative (metrology data to be acquired), the method 1300 proceeds to block 1308 where an image is acquired by the camera 1120. In an embodiment, the projector 1110 emits light of a predetermined wavelength, such as blue light (450 nm), green light (532 nm) or cyan light (~500-520 nm). The light is scattered off of the surface of the object, passes through the lens assembly 1122, through the Bayer filter 1130 and onto the photosensitive array 1128. It should be appreciated that while many or all of the pixels on the photosensitive array 1128 will receive light, this pixels that correspond to the projected light should have the highest brightness. For example, when blue light is projected by the projector 1110, the blue pixels on the photosensitive array 1128 should have higher values than the green or red pixels.

Figure 14:
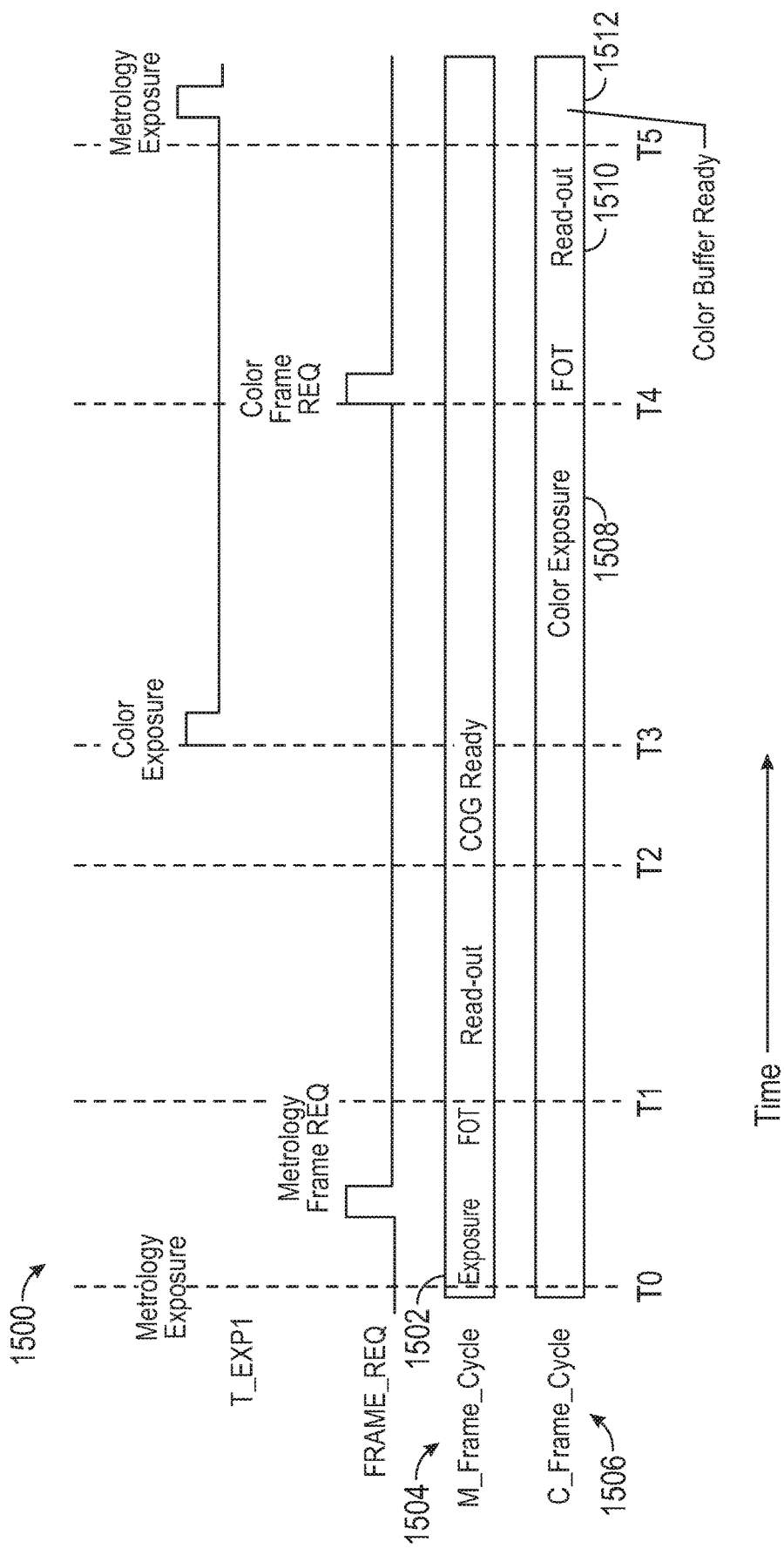
FIG. 14 and FIG. 15 are a time plot of the acquisition of metrology and color images according to an embodiment.
Figure 15:
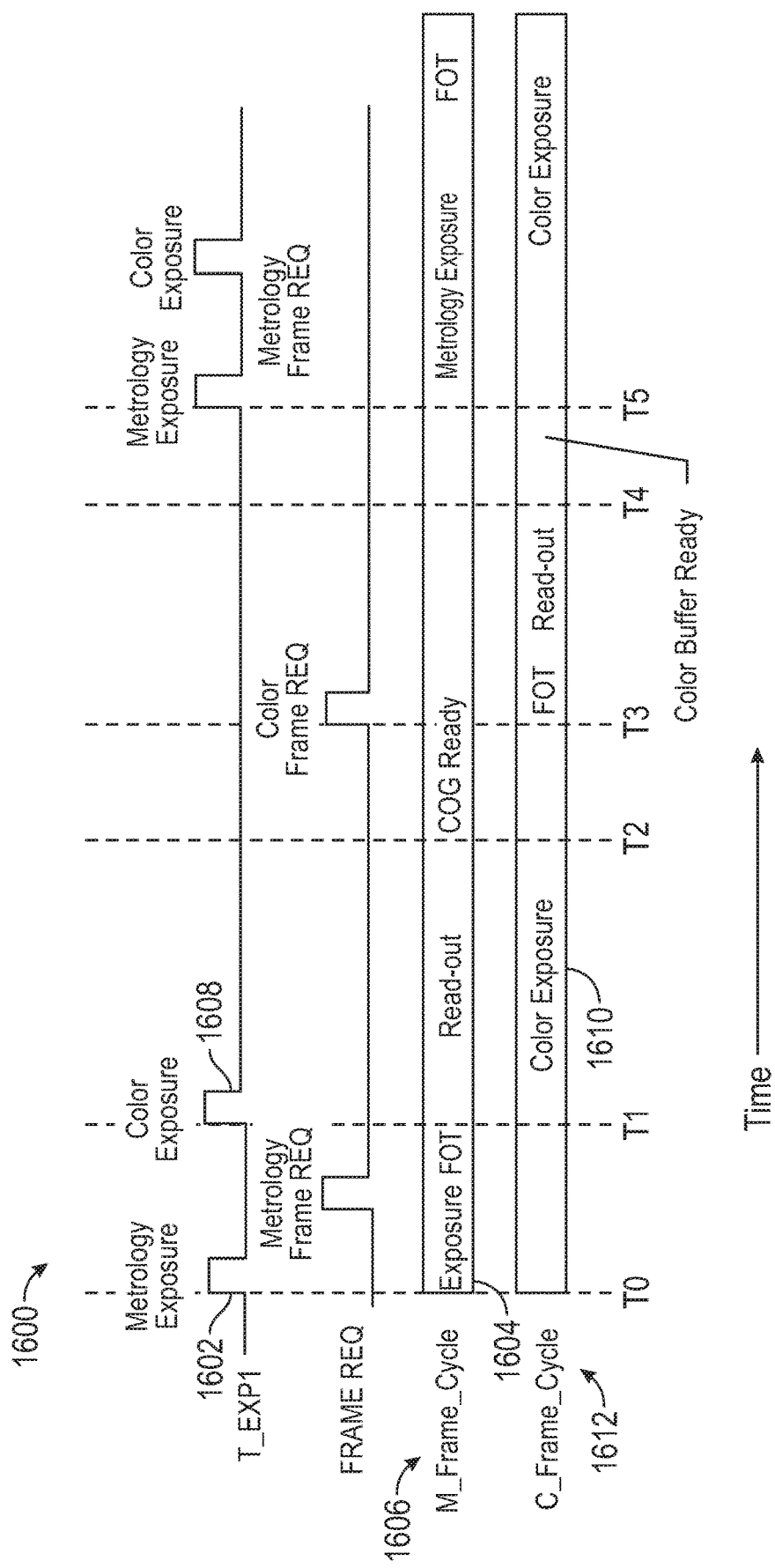

The method 1300 then proceeds to block 1310 where the values of the pixels corresponding to the projected light are used to estimate values of the other pixels based on interpolation. The method 1300 may then proceed to block 1312 where filtering and edge detection is performed. The centers of gravity (COG) points that represent the image of the projected line are then determined in block 1314 as is known in the art. It should be appreciated that when the projected line strikes the surface of the object, the image of that line will distort based on the geometry of the surface. In this way, metrology data may be acquired. An example of the image 1316 of the projected line 1318 on the photosensitive array 1128 is shown in FIG. 14. An example of the COG's 1320 determined from the image of the projected line is shown in FIG. 15.

With the COG's determined, the method 1300 proceeds to block 1322 where the three-dimensional coordinates of points on the surface of the object are determined for each COG. The method 1300 then proceeds to block 1324 where the counter is incremented and the method 1300 loops back to query block 1306.

When the query block 1306 returns a positive, meaning that a color image frame is to be acquired, the method 1300 proceeds from query block 1306 to block 1326 where the color image is acquired by the camera 1120. An example of the color image 1330 is shown in FIG. 14. In an embodiment, the color image is acquired using ambient light that is found in the environment. In another embodiment, light sources such as LED light sources on the laser line probe 1100 are substituted for the laser line light source and activated to emit light onto the surface of the object as described here. In other words, the laser line light source and the LED light sources are not active or turned-on at the same time. In an embodiment, the camera may acquire multiple color images and a high dynamic range (HDR) methods are used to improve the resulting color image. In one embodiment, a first color image is acquired using an auto-exposure. This first image is then used to determine a second exposure in a second image. The first image and second image are then combined using HDR methods to generate the color image. The HDR images may be acquired and generated in a similar manner to that described in co-owned U.S. Pat. No. 9,658,061 entitled "Line scanner that uses a color image sensor to improve dynamic range", the contents of which are incorporated by reference herein. It should be appreciated that while embodiments herein describe the HDR images as being generated from two exposure levels, this is for exemplary purposes and the claims should not be so limited. In other embodiments, a plurality of exposure levels (e.g. 3 exposure levels) may be used to generate the HDR image.

After acquiring the color image, the method 1300 proceeds to block 1328 where a DeBayer filter is applied to the raw image data. The DeBayer filer is a demosaicing to interpolate the color values of adjacent pixels. The method 1300 then proceeds to block 1332 where the color image is correlated to the metrology image as shown as composite image 1334 in FIG. 14. The method 1300 then proceeds to block 1336 where the color data for each COG location is extracted from the color image. In some cases, one or more individual COG's may not be determined, such as due to multipath interference for example. In some embodiments, an estimated location 1321 (FIG. 15) of the missing COG may be determined. In some embodiments, the color from the estimated location is stored.

It should be appreciated that the laser line probe 1110 may move during the time period between the last metrology image frame and the acquisition of the color image. As a result, temporal errors may occur between the metrology data and the color data. In an embodiment, shown in FIG. 15, when the color data is extracted, in addition to the color at the location of each COG, the color data for a predetermined number of pixels on either side of the COG pixel (e.g. the pixel along the array column or row) is also stored. In the exemplary embodiment, the color data for 32 pixels on either side of the COG pixel (64 pixels total) are saved. It should be appreciated that the amount of color data may be changed based on the memory available in the processing circuit of the laser line probe 1100. The color "band" of pixels. Utilizing the six-degree of freedom information of the laser line probe 1100 determined by the AACMM 10, an estimate of the color that should be assigned to the COG may be determined, based on the position, orientation and movement of the laser line probe 1100. It should be appreciated that this may improve the correlation of the color assigned to the COG.

In an embodiment, at the time the color image is acquired, the six-degree-of-freedom position of the camera center is stored in the AACMM 10 coordinate frame of reference. In an embodiment, the six-degree-of-freedom position is located at the camera perspective center. After the COG's are determined, the three-dimension positions of the COG's are projected onto the color image. In other words, the six-DOF position of the camera in the arm frame of reference a first camera frame used to obtain the 3D coordinates with the projected stripe and in a second camera frame used to obtain the color 2D image using background light. The change in the six-DOF position from the first frame to the second frame is used to determine the amount of shift that should be applied to the 2D color image to more accurately assign the color to the determined 3D coordinates at the COG.

In an embodiment, the data for a band of color associated with each COG may be filtered, such as with a lossless data compression algorithm, such as run-length encoding (RLE) for example.

With the color data associated with the COG's, the method 1300 then proceeds to block 1338 where the counter is reset to 1. The method 1300 then loops back to query block 1306 where the method 1300 continues while the scanning with the laser line probe continues.

Referring now to FIG. 14, a portion of the method of FIG. 13 is shown as a function of time. The system initiates a metrology exposure 1500 at time T0 which initiates the exposure 1502 of the sensor as part of the metrology frame cycle 1504. The exposure 1502 is completed at time T1 and the metrology frame is acquired. The metrology frame is read out and completed at time T2 when the COG is determined. At time T3, the color frame cycle 1506 is initiated. The color exposure 1508 occurs from time T3 to time T4. The read out 1510 of the color data is then completed by time T5. The color data is stored in the color buffer 1512. Once the color data is read out, the metrology frame is once again initiated.

The embodiment of FIG. 14 illustrates a sequential acquisition of metrology and then color frames. This type of acquisition process may be suitable for camera shutter types, such as a rolling shutter for example. With a rolling shutter, a leading curtain moves exposing the sensor array row by row. When the desired exposure time has elapsed, a closing curtain follows the leading curtain in moving across the sensor thus stopping the exposures of the pixels on a row by row basis. When the closing curtain has traversed the width of the sensor, the frame acquisition is completed.

Referring now to FIG. 15, another sequence 1600 of acquiring image frames is illustrated. In this embodiment, the camera 1128 uses a type of shutter referred to as a global shutter. With a global shutter, the incoming light to all photodiodes in the array may be controlled simultaneously. At any given point in time, photodiodes may be selectively opened or closed on a row by row basis. This type of shutter is sometimes referred to as an electronic shutter. An example of a camera sensor that uses a global shutter is a Model CMV2000 v3 CMOSIS imager manufactured by AMS Sensors of Antwerp, Belgium. As a result, advantages may be achieved in reducing the image frame acquisition time since the color image frame may be acquired on a portion of the photosensitive array while the metrology image frame is still being acquired on another portion of the photosensitive array.

In this embodiment, the metrology exposure 1602 is initiated at time T0 to start the exposure 1604 metrology frame cycle 1606. The exposure is completed at time T1. At time T1, as the exposure of the metrology image is completed and the read out initiated, the color exposure 1608 is initiated to start the exposure 1610 of the color frame cycle 1612. The metrology frame readout is completed at time T2 and the color exposure is completed at time T3. The color read out is completed at time T4 and the data is stored in the color buffer. At time T5, while the data is being stored in the color buffer, the next metrology exposure may be initiated and the cycle begins again.

It should be appreciated that using a camera with a global shutter will place metrology and color exposure very close in time to each other. Thus, gap between two sequential exposures is smaller and in an embodiment, the two sequential exposures are assumed to be one exposure. As a result, the color mapping and interpolation steps used in the embodiment of FIG. 14 due to scanner's moving speed may be eliminated. This provides advantages in reducing the large amount of color pixel data that would otherwise be transported throughout the system due to mapping and interpolation requirement. In some embodiments this may provide still further advantages in that the large bandwidth used to transfer data between the laser line probe 1100 and base processor electronics and could improve frame rates since the arm bus 2184 may not be a bottleneck in the data flow.

Figure 16:
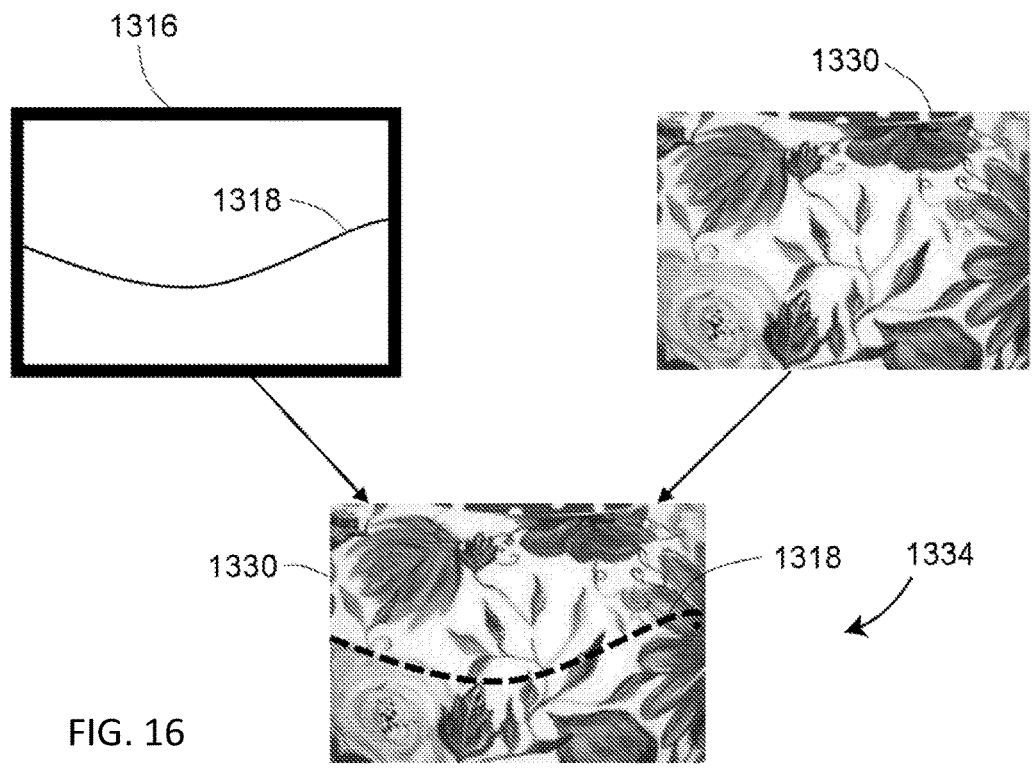
FIG. 16 is a schematic view of the correlation of the metrology image and color image according to an embodiment.

Referring now to FIG. 16, an embodiment of the data flow 1400 in the laser line probe 1100. The data flow starts in block 1402 where the raw or "untap" image data is received from the image sensor 1128. The data then proceeds to block 1404 where the raw data is adjusted based pixels that are known to provide errors, such as a nonfunctioning or "dead" pixel, or a pixel that consistently provides a saturated value for example. The data then proceeds to a Bayer subsampler module 1406 which outputs a red, green and blue values. The flow of the data then bifurcates depending on whether the camera 1120 is to acquire a color or a metrology image. As discussed above, in the illustrated embodiments the metrology and color images are interleaved. In an embodiment, the ratio of metrology images to color images may be fixed or user-defined.

In the case of a metrology image sequence, data for the color associated with the projector 1110 flows from the output of the Bayer subsampler module 1406 to an interpolator 1408. In the illustrated embodiment, the projector 1110 emits a blue light (e.g. 450 nm) to form the projected line. Thus, the blue pixel value output 1410 is transmitted to the interpolator 1408. In other embodiments, data from the green output or the red output of the Bayer subsampler module 1406 may be transferred to the interpolator 1408.

The interpolator 1408 uses the data values from the blue pixels 1410 to generate estimated values for the green and red pixels of the photosensitive array 1128. From the interpolator 1408, the resulting data is processed by a Gaussian filter 1412 that reduces the amount of noise in the data. In an embodiment, the Gaussian filter performs a weighted averaging of the data. From the Gaussian filter 1412, the data flows to an edge detection module 1414. In an embodiment, the edge detection module 1414 identifies an edge or a line (such as line 1318, FIG. 14) at the location of the peak light intensity. Thus, the edge detection module 1414 generates a single edge representing the line along which the COG's are located.

With the edge detected, the data then flows to module 1416 where the data away from the detected edge is removed from the data. It should be appreciated that this provides advantages in reducing the size of the dataset. From module 1416, the data flows to COG centroid module 1418. The COG centroid module 1418 identifies the locations (row, column) of the COG's along the detected edge. These results are stored in memory module 1420 and passed along to histogramer module 1422. The histogramer module 1422 monitors the saturation levels of the area of interest (e.g. the area of the detected edge). The output of the histogramer module 1422 is used by the autoexposure module 1424. A main control module 1426 receives the output of the histogramer module 1422 and also the stored COG values from memory module 1420. The main control module 1426 also manages communication with the base electronics 2000 (FIG. 2), the image sensor 1120, and the projector 1110.

For instances where a color image is to be acquired, the red, green and blue output from the Bayer subsampler module 1406 passes to a DeBayer module 1428. As discussed herein, the DeBayer module demosaicizes the input image data and generates a red, green and blue output with row and column data. In an embodiment, this demosaicized data flows to a color buffer module 1430.

In an embodiment, the COG data is transferred to modules 1432, 1434 that generate a COG lookup table. From the COG lookup table a COG interpolation module 1436 estimates locations of COG's where the COG was not identified (e.g. due to multipath interference) in module 1418.

The color buffer 1430 receives inputs from the DeBayer module 1428 and the COG interpolation module 1436. From these inputs, the color image is correlated to the COGs 1320, 1321. In one embodiment, the color buffer 1430 outputs a single color for each COG 1320, 1321. In another embodiment, the color buffer 1430 correlates the color of the pixel at the COG and a predetermined number of pixels (e.g. 32 pixels) on either side (row or column) of the pixel at the COG. This row of pixels may be processed by a filter 1438 such as via a RLE for example. The resulting color data associated with the COG's is then passed to the color control module 1440.

In an embodiment, the autoexposure data is passed from module 1424 to a color autoexposure module 1442. Further, in an embodiment where a light source (e.g. an LED light source) is provided for the color image acquisition, a range finder module 1444 may estimate the distance to the object. From this range data and the autoexposure data, the timing of the light source may be changed when the color image is acquired.

Figure 17:
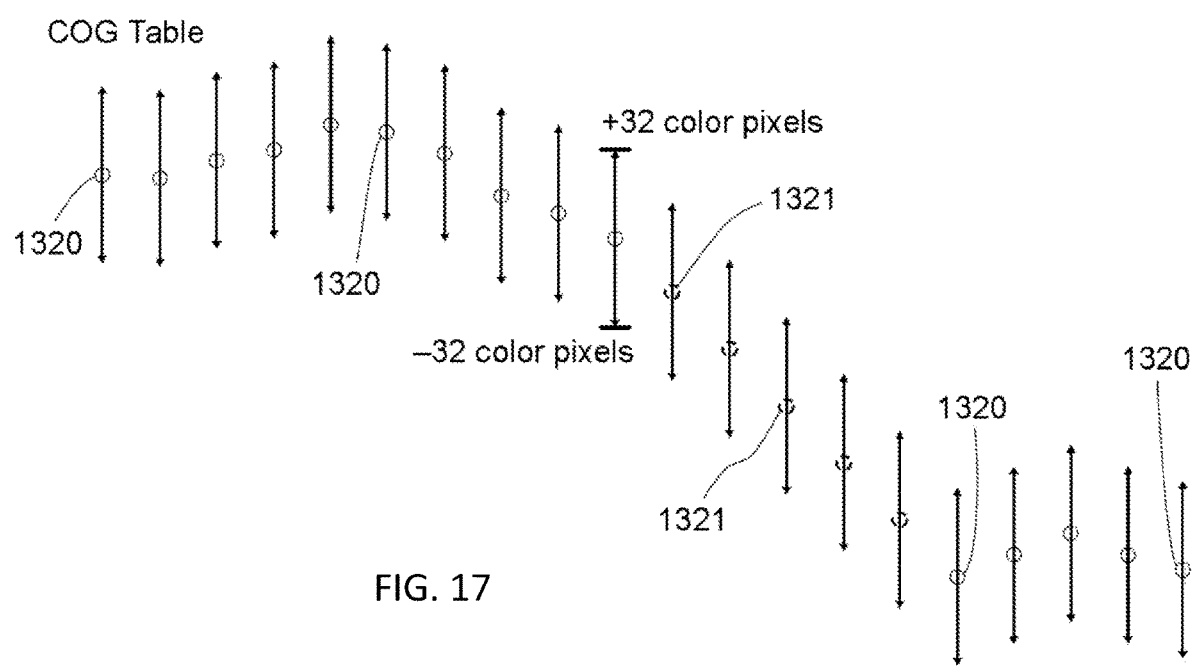
FIG. 17 is a schematic view of a COG curve according to an embodiment.

Referring now to FIG. 17, another embodiment is shown of a camera 1450. In this embodiment, the light 1134 reflected off of the surface of the object passes through the lens assembly 1122. The output light 1452 from the lens assembly strikes a beam splitter 1454. In an embodiment, a portion of the light 1452 passes through the beam splitter 1454 and strikes a photosensitive array 1456. In this embodiment, the photosensitive array is monochromatic does not include a Bayer filter. In one embodiment, a bandpass filter may be arranged between the beam splitter 1454 and the photosensitive array 1456. The bandpass filter allows a predetermined wavelengths of light that correspond to the projector light wavelength to pass through. Thus, the photosensitive array 1456 may be used to capture an image of the beam of light on the surface of the object.

A second portion of light 1458 reflects off of beam splitter 1454 and is directed towards mirror 1460. The mirror 1460 reflects the light 1458 towards sensor assembly 1124. As described above with respect to FIG. 10, the sensor assembly 1124 includes a Bayer filter 1130 and a photosensitive array 1128 and acquires color images. The camera 1450 may provide advantages in allowing the metrology image to be acquired by photosensitive array 1456 and the color image by photosensitive array 1128 simultaneously. Therefore, the processing of the metrology data and the color data may occur at the same time, improving the scanning speed of the laser line probe 1100. Further advantages may be gained in that the images would not be interleaved and the temporal errors discussed herein would not occur.

Figure 18:
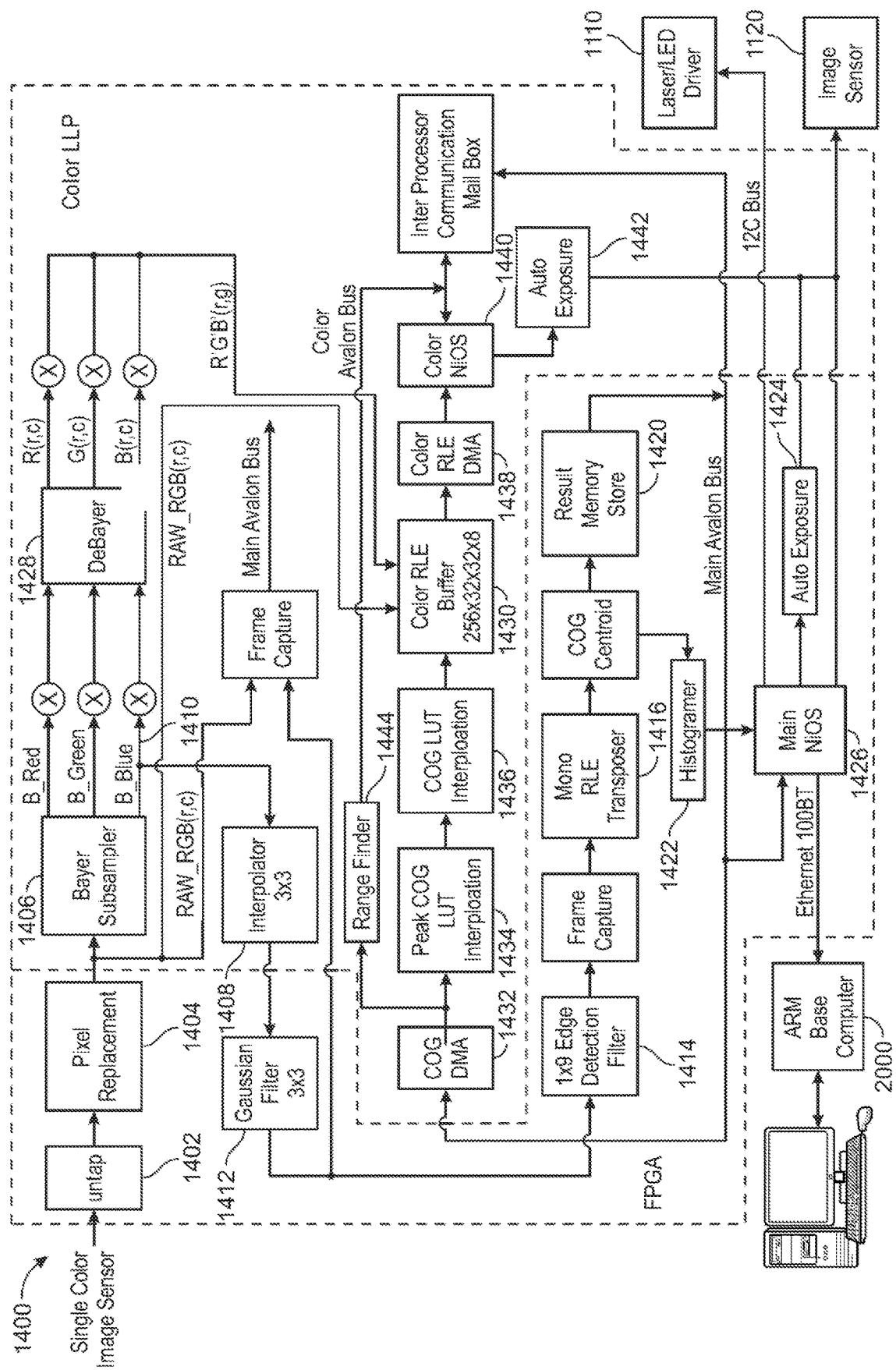
FIG. 18 is a schematic view of data flow within the AACMM according to an embodiment.

In some embodiments, the AACMM 10 or the laser line probe 1100 (either together or separately) may be used with other metrology devices, such as a laser tracker 3300 in combination with a retroreflector device 3395. When the retroreflector is coupled to an AACMM 10 the position of the AACMM 10 may be measured by the laser tracker 3300 as shown in FIG. 33. In an embodiment, the laser tracker 3300 sends a beam of light 3390 out of the tracker exit aperture 3374 toward a retroreflector 3395, which in an embodiment is a retroreflector SMR 3395 as shown in FIG. 18. In another embodiment, the laser tracker 3300 sends a beam of light 3390 to a retroreflector coupled to the AACMM 10. It should be appreciated that the term laser tracker as used herein refers to any 3D measuring device that emits a beam of light and measures 3D coordinates in response. The beam of light may be any type of light, not only laser light but also light from a light emitting diode, a superluminescent diode, or any type of incoherent, coherent, or partially coherent light source. The SMR returns light 3392 in a direction opposite that of the outgoing light 3390. A first portion of the light 3392 returning to the tracker 3300 and passing through the exit aperture 3374 travels to an absolute distance meter that determines the distance from the laser tracker 3300 to the SMR 3395. A second portion of the returning light 3392 travels to a position detector that records a position of the returning light 3392 inside the tracker 3300. A control system within the tracker uses the position information from the position detector to steer the outgoing light 3390 to the center of the SMR 3395. As the SMR 3395 is moved, the outgoing light 3390 tracks the SMR 3395 by keeping the outgoing light 3390 centered on the SMR 3395. Because the surface of the SMR partial sphere 2403 is always a constant distance from the center of the SMR 3395 and vertex 2402 of the cube-corner retroreflector 2401, the surface of the object being measured may be determined by measuring the 3D coordinates of the SMR 3395 as the SMR is moved across the surface of the object.

In an embodiment, it may be desired to measure a hidden point on an object, the hidden point being a point for which the outgoing beam of light 3390 is blocked from reaching the SMR 3395 positioned at the hidden point. In another embodiment, it may be desired to measure a relatively small feature for which the diameter of the SMR 3300 is too large to provide a desired fine resolution. In either of these situations, when it is desired to measure a hidden point or to measure with a resolution finer than possible with an SMR 3395, the AACMM 10 may advantageously be used in combination with the laser tracker 3300. To measure 3D coordinates using a combination of the laser tracker 3300 and the AACMM 10, the 3D measurements made by the laser tracker 3300 and the AACMM 10 need to be obtained in a common frame of reference, such as the frame of reference of the laser tracker 3300.

Figure 19:
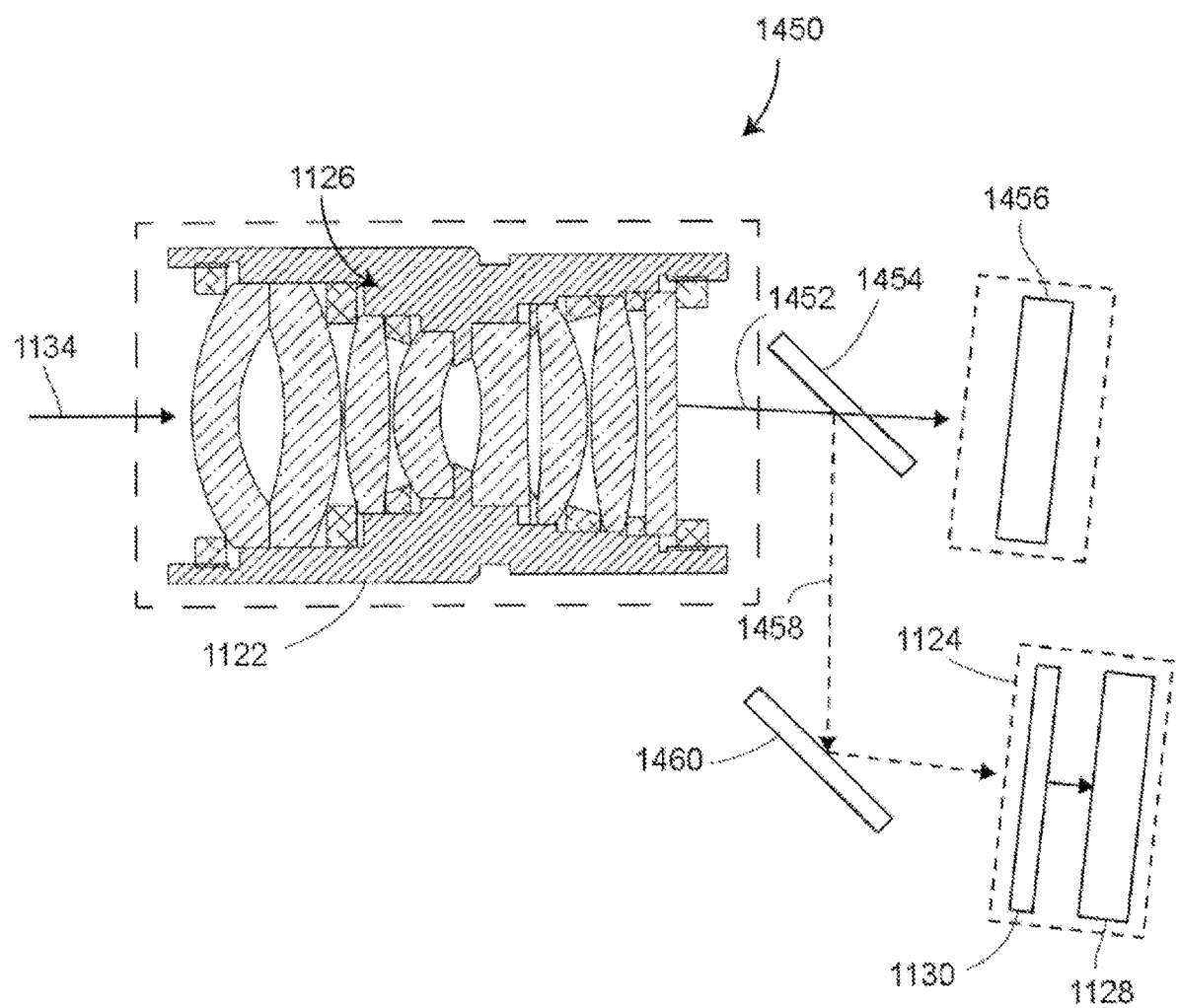
FIG. 19 a partial cross-sectional view of a camera portion of a laser line probe according to another embodiment of the present invention.
Figure 20:
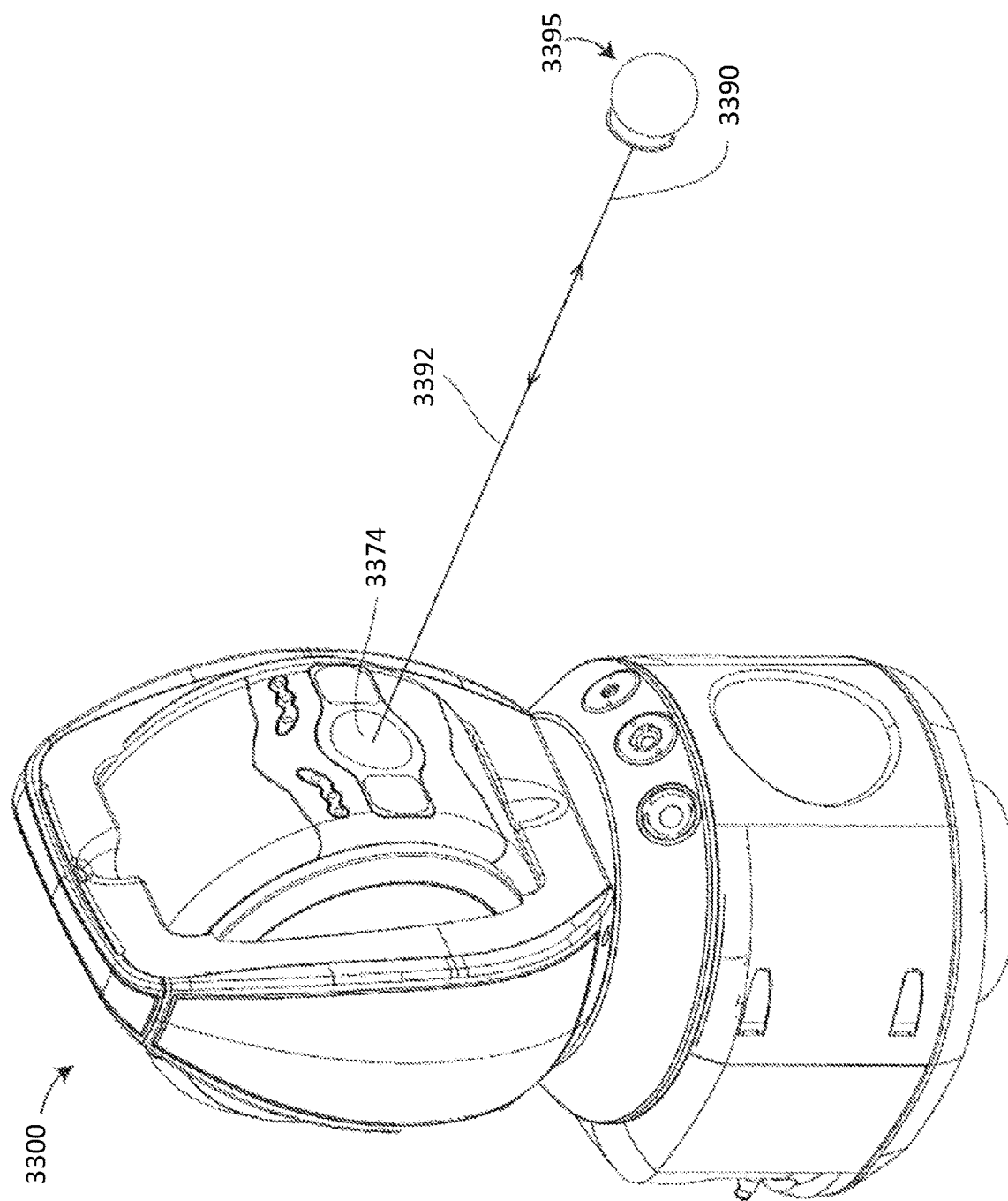
FIG. 20 is an isometric view of a laser tracker and an SMR according to an embodiment of the present invention.
Figure 21:
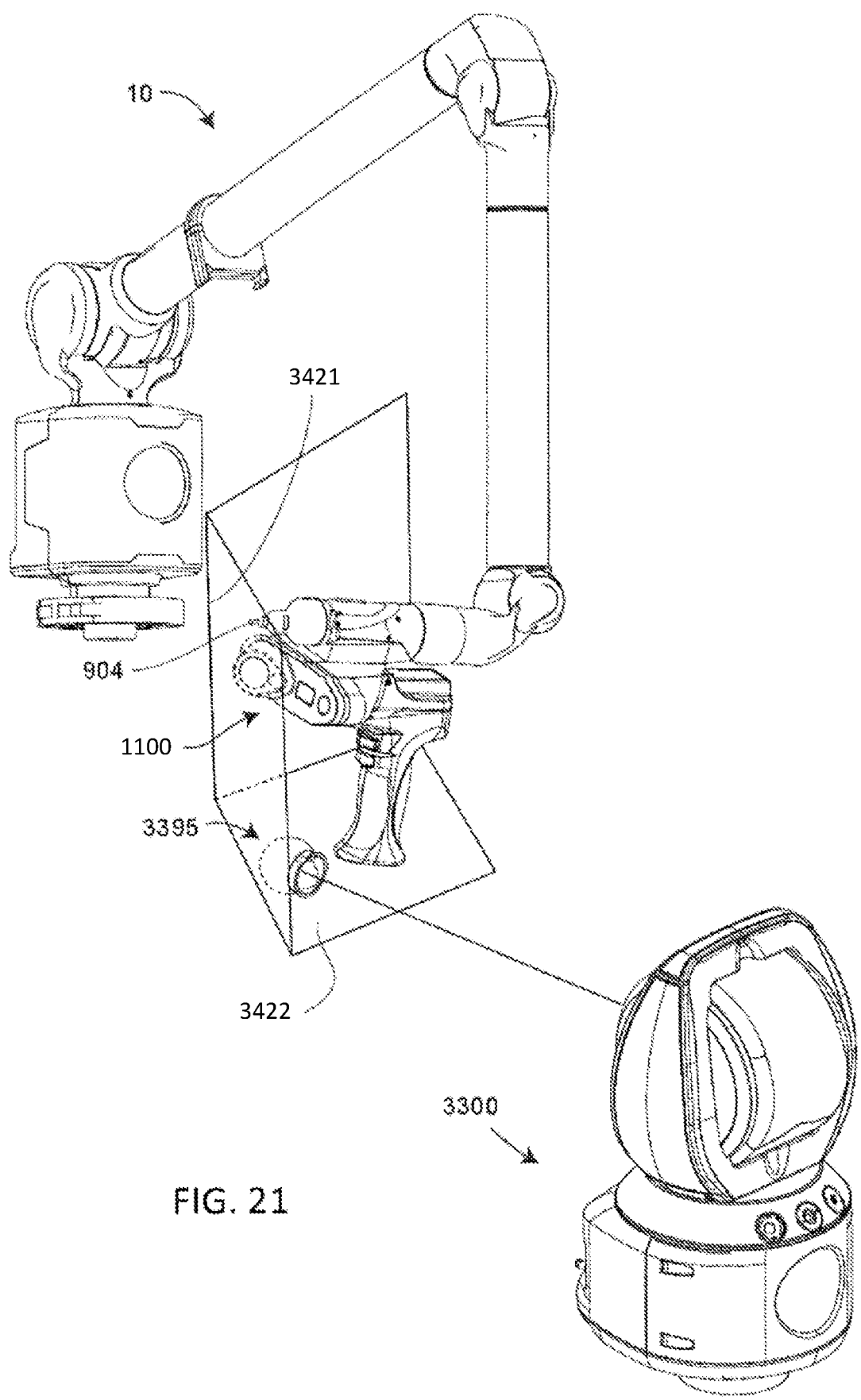
FIG. 21 is an isometric representation of a probe tip and a laser line probe coupled to an AACMM being used to measure 3D coordinates to an increased resolution in combination with a tracker SMR according to an embodiment.

Another advantage of this approach is the ability to measure features having details too fine or small to measure with an SMR 3395. An example of an object having relatively fine/small features is shown in FIG. 19. The fine/small details 3421 in the edges and corners may be measured with a probe tip 904 which has a relatively small diameter compared to the SMR 3395, or the fine details 3421 can be measured by a laser line probe 1100. Further, the SMR may bused to measure surfaces 3422. Thus, the measurements of the AACMM 10 may be converted into the frame of reference of the laser tracker 3300.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A portable articulated arm coordinate measuring machine (AACMM) for measuring the coordinates of an object in space, comprising:
a base;
a manually positionable arm portion coupled to the base and having an end opposite the base;
a measurement device coupled to the end;
an electronic circuit that is operable to determine a position of the measurement device relative to a frame of reference;
a laser line probe operably coupled to the end, the laser line probe having a projector and a camera, the projector being operable to project a line of light at one or more predetermined wavelengths, the camera having a lens assembly optically coupled to a sensor assembly, the sensor assembly having a photosensitive array and a filter disposed between the photosensitive array and the lens assembly, the filter having a plurality of red, green and blue pixels in a predetermined arrangement; and
a controller operably coupled to the laser line probe, the controller being operable to cause the camera to acquire a metrology image and a color image, wherein the controller and the electronic circuit cooperate to determine the three-dimensional coordinates of points on a surface based at least in part on the metrology image and to assign a color to the points based at least in part on the color image;
wherein the photosensitive array includes a plurality of photosensitive array pixels, each of the plurality of photosensitive array pixels being aligned with one of the filter elements;
the controller is further operable to receive pixel values from a first portion of the plurality of photosensitive array pixels and interpolate pixel values to a second portion of the plurality of photosensitive array pixels; and
the controller is further operable to determine center of gravity locations based at least in part on the pixel values of the first portion and the second portion of the plurality of photosensitive array pixels.

2. The AACMM of claim 1, wherein the controller is operable to cause the metrology image to be acquired when the projector emits the line of light.

3. The AACMM of claim 1, further comprising a light source operably coupled to the controller, wherein the controller is further operable to activate the light source when the color image is acquired.

4. The AACMM of claim 3, wherein the light source is an RGB laser.

5. The AACMM of claim 1, wherein the one or more predetermined wavelengths are between 450-495 nm.

6. The AACMM of claim 5, wherein the one or more predetermined wavelengths is 450 nm.

7. The AACMM of claim 1, wherein the one or more predetermined wavelengths is 532 nm.

8. The AACMM of claim 1, wherein the one or more predetermined wavelengths is between 500-520 nm.

9. The AACMM of claim 1, wherein the controller is further operable to determine colors of a predetermined number of pixels adjacent to each center of gravity location, and wherein the assignment of color is based at least in part on the determined colors.

10. The AACMM of claim 1, wherein the filter is a Bayer filter.

11. The AACMM of claim 1, wherein the laser line probe further comprises at least one light source that during operation selectively emit a white light onto the surface.

12. The AACMM of claim 1, wherein the controller is operable to acquire the metrology image and the color image in an interleaved sequence.

13. The AACMM of claim 12, wherein the interleaving ratio of metrology images to color images is greater than 1:1.

* * * * *